(12) United States Patent
Kaploun

(10) Patent No.: US 6,943,461 B2
(45) Date of Patent: Sep. 13, 2005

(54) ALL-WEATHER ENERGY AND WATER PRODUCTION VIA STEAM-ENHANCED VORTEX TOWER

(76) Inventor: Solomon Kaploun, 5/1 Strouma Street, Haifa (IL), 35708

( * ) Notice: Subject to any disclaimer, the term of this patent is extended or adjusted under 35 U.S.C. 154(b) by 132 days.

(21) Appl. No.: 10/133,488

(22) Filed: Apr. 29, 2002

(65) Prior Publication Data

US 2003/0201646 A1 Oct. 30, 2003

(51) Int. Cl.$^7$ .......................... F03B 13/00; F03B 13/10; H02P 9/04; F03D 9/00
(52) U.S. Cl. ............................. 290/43; 290/44; 290/54; 290/55
(58) Field of Search .............................. 290/44, 55, 43; 60/641.11, 641.02, 348, 676; 415/2.1, 4.2, 7, 2

(56) References Cited

U.S. PATENT DOCUMENTS

| | | | |
|---|---|---|---|
| 1,112,203 A | * 9/1914 | Pandrey | 415/4.4 |
| 3,936,652 A | * 2/1976 | Levine | 290/2 |
| 4,064,409 A | 12/1977 | Redman | |
| 4,070,131 A | * 1/1978 | Yen | 415/4.4 |
| 4,095,118 A | 6/1978 | Ruthbun | |
| 4,135,493 A | 1/1979 | Kennedy | |
| 4,157,368 A | * 6/1979 | Fernandes | 261/155 |
| 4,211,084 A | 7/1980 | Wallace | |
| 4,242,591 A | 12/1980 | Harville | |
| 4,339,547 A | * 7/1982 | Corbett et al. | 518/728 |
| 4,421,452 A | * 12/1983 | Rougemont | 415/4.2 |
| 4,433,248 A | 2/1984 | Marks | |
| 4,433,544 A | * 2/1984 | Wells et al. | 60/641.12 |
| 4,438,341 A | 3/1984 | Winterbotham | |
| 4,452,046 A | * 6/1984 | Valentin | 60/641.11 |
| 4,452,562 A | * 6/1984 | Hsu | 415/208.1 |
| 4,499,034 A | * 2/1985 | McAllister, Jr. | 261/109 |
| 4,691,130 A | 9/1987 | Gillissen | |
| 4,755,352 A | 7/1988 | Glen et al. | |
| 4,779,006 A | * 10/1988 | Wortham | 290/55 |
| 4,894,993 A | 1/1990 | Assaf et al. | |
| 4,935,639 A | * 6/1990 | Yeh | 290/55 |
| 5,096,467 A | * 3/1992 | Matsui | 95/269 |
| 5,227,683 A | 7/1993 | Clair | |
| 5,300,817 A | * 4/1994 | Baird | 290/55 |
| 5,478,197 A | 12/1995 | Schatz et al. | |
| 5,480,594 A | * 1/1996 | Wilkerson et al. | 261/109 |
| 6,016,015 A | * 1/2000 | Willard, Jr. | 290/55 |
| 6,215,199 B1 | * 4/2001 | Lysenko et al. | 290/44 |
| 6,518,680 B2 | * 2/2003 | McDavid, Jr. | 290/54 |
| 6,590,300 B1 | * 7/2003 | Preito Santiago | 290/55 |

* cited by examiner

Primary Examiner—Nicholas Ponomarenko
Assistant Examiner—Julio Gonzalez
(74) Attorney, Agent, or Firm—LO Tompakov; Galina Tompakov

(57) ABSTRACT

A wind vortex tower is enhanced by kinetic energy and heat of quasi-tangential and upward jets of saturated steam energizing, accelerating tornado-type flow and supporting stable electricity generation during the insufficient winds and calm. For action instead of absent wind at starts and operation over a long time, a staged system of flexible nozzles injects the steam jets into the zones of vortex channel. The system controls the tornado-type flow in the vorticity energizer, swirlers of sucked ambient air, condensate separators, re-enhancer of airflow and top diffuser. The steam is flashed from partially stored condensate heated nearly to 100° C. The condensate is partially delivered after centrifugal separation from saturated vortex core. The outside water heating system has one or two of compatible renewable, waste and secondary, or initial heat sources, and is intensified via sucking of heated water by vortex flow. A large-rating flow-through electric generator has an alternating magnetic whirl formed by magnetic concentrators whirled near vortex core and a three-phase stator with switched modules. The simplified towers are used for water and conditioned air production.

18 Claims, 17 Drawing Sheets

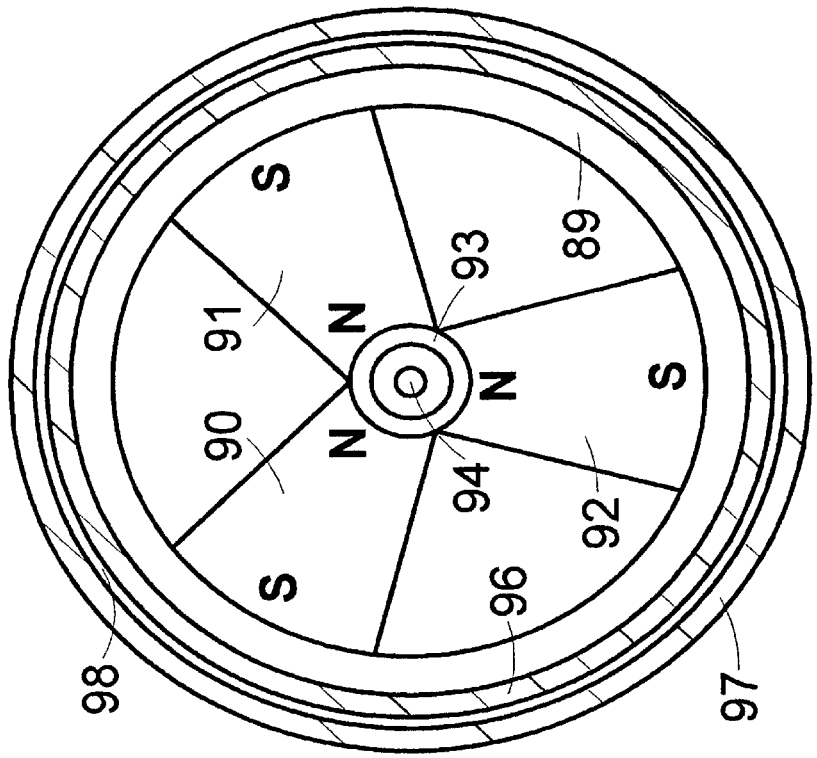
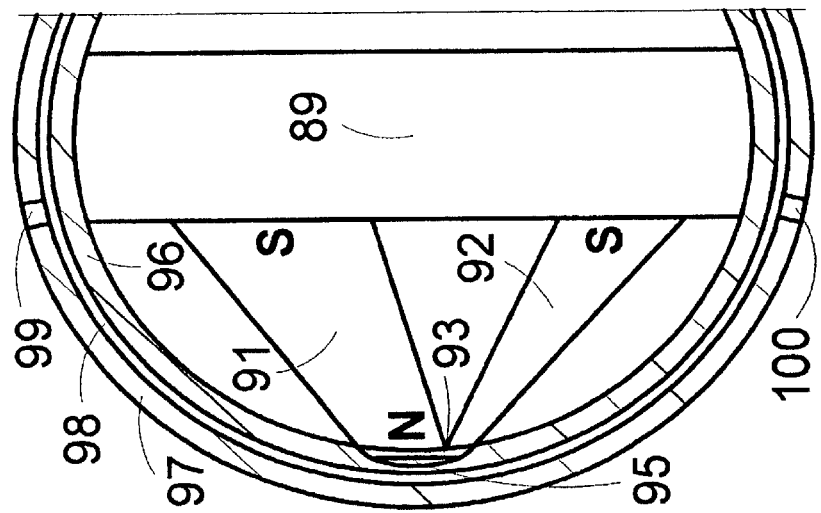

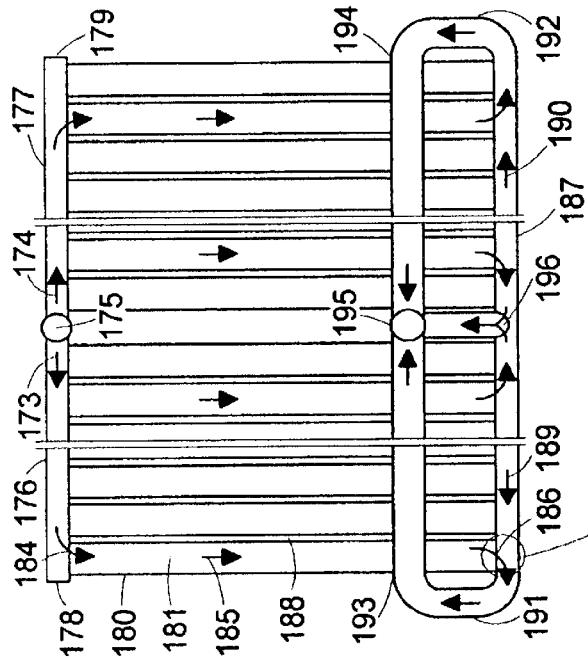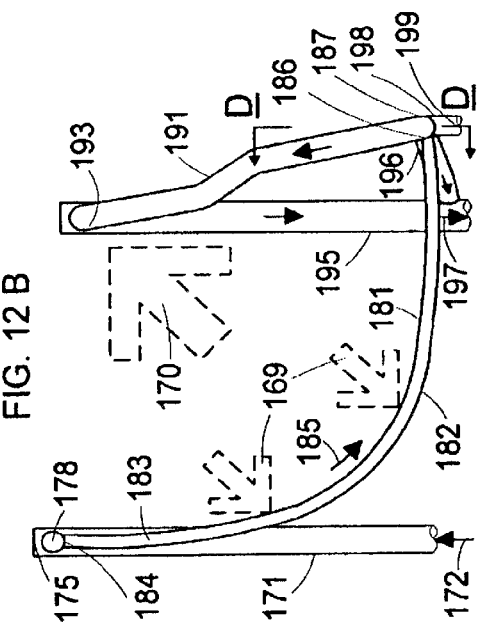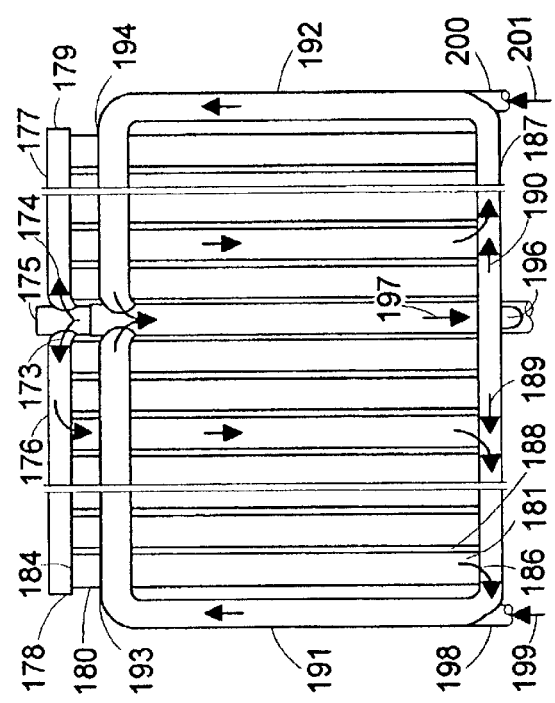

F-F

E-E

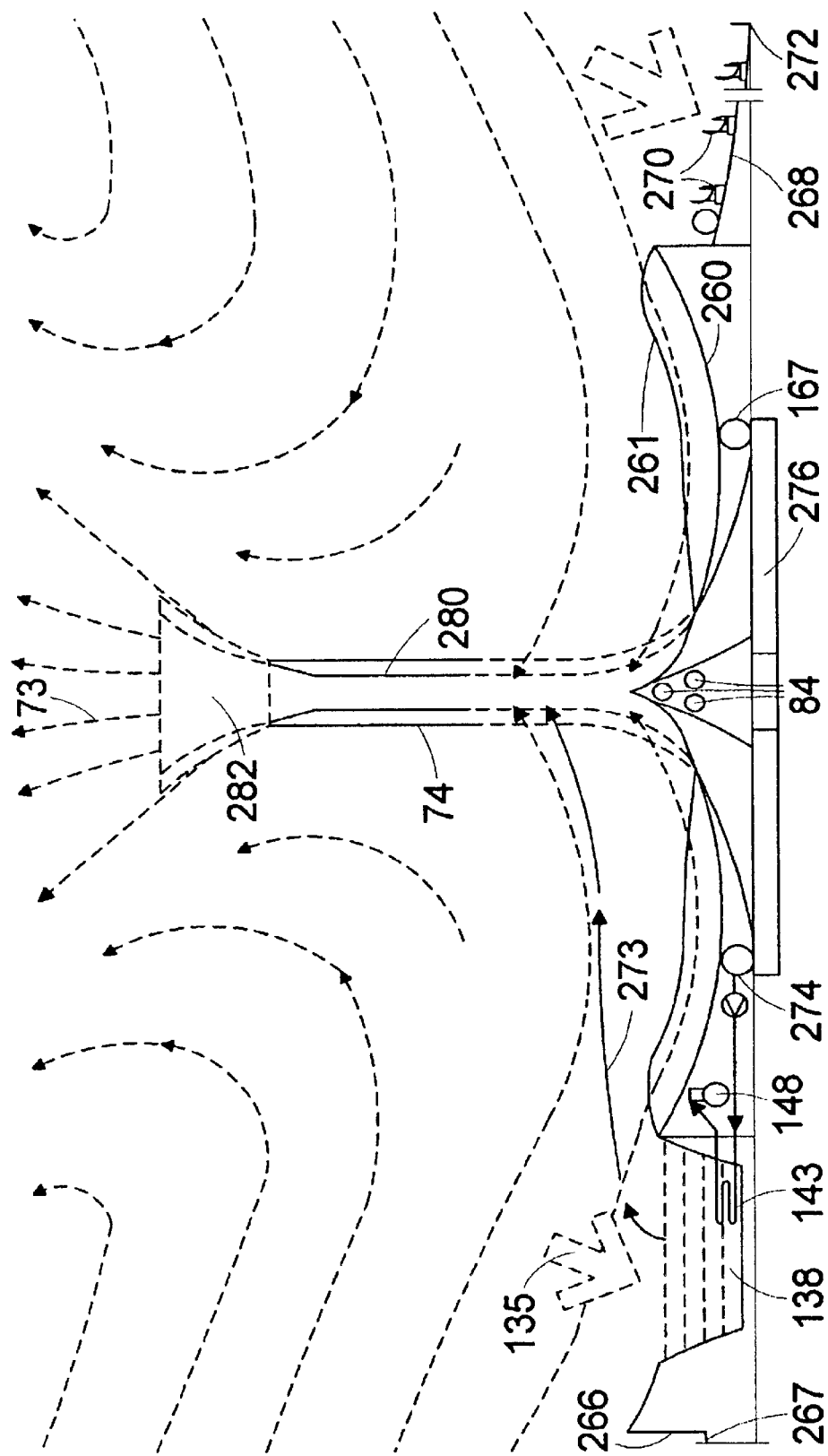

ALL-WEATHER ENERGY AND WATER PRODUCTION VIA STEAM-ENHANCED VORTEX TOWER

BACKGROUND OF THE INVENTION

1. Field of the Invention

This invention relates to vortex power plants, and particularly to plants with tornado-type wind tower supplementary enhanced by kinetic energy and heat of staged system of steam jets utilizing water heating source for all-weather energizing of vortex flow, large-scale power generation in a single flow-through electrical generator over a long time, and water or conditioned air production.

2. Description of the Prior Art

The wind vortex towers offered previously utilize for power generation only kinetic energy of a secondary airflow. The airflow is sucked by a vortex flow through an opening(s) with an air turbine(s), after getting the wind into the tower through guiding and accelerating moving structures, as in U.S. Pat. Nos. 4,070,131, 4,452,562, 4,499,034, 6,016,015, 6,215,199 and 6,518,680. Various sources and ways of heat intake near bottom of the wind vortex tower also were suggested for power augmenting, as in U.S. Pat. Nos. 4,211,084, 4,452,046, 4,935,639, 5,096,467, 5,478,197, 6,532,740 and 6,590,300. Partly, U.S. Pat. Nos. 4,452,046 and 6,590,300 disclose usage of heat of saturated air near the bottom, augmenting vortex power. However, such vortex process can proceed interactively only at sufficient wind as a medium for energizing of vorticity. The near-bottom spraying of the superheated steam, and higher dispersion of the heated water into outside airflows, as in U.S. Pat. No. 6,532,740, and do not energize vorticity without the wind. They do not control differently the zones of vortex flow and do not adapt the chamber for direct power generation. Moreover, the number of air turbines used before the chamber is limited by number of large assemblies moved for catching the changeable wind.

The limited strength of conventional air turbine and mentioned moving structures used in the referred patents, including U.S. Pat. No. 6,590,300, defines an attainable electrical power several orders of magnitude lower of the excess power of tornado-type flow. Usage of more than one air turbine as in U.S. Pat. Nos. 4,499,034 and 6,532,740, or several interconnected towers as in U.S. Pat. No. 4,452,046, not assists the creation of space saving and cheap vortex unit of large rated power.

The same relates to concept of a non-confined vortex flow possible in the torrid zone via artificial near-bottom swirling of the upward convection flow of the solar heated air, as in U.S. Pat. No. 4,211,084. Every developed whirlwind gives low capacity that corresponds to limited capacity of the conventional turbine. But absence of confining tower makes vortex flow unstable under any wind, reduction of air temperature or raise of air humidity. An attempt to augment power through near-bottom heating of the air, as in U.S. Pat. No. 4,211,084, increases losses of energy and moisture into the atmosphere above the near-bottom turbine. The similar attempts to support a confined large-scale vortex flow via artificial near-bottom swirling of the preliminary heated convection airflow face the problems of too large sizes of heating collector and chimney, large number of turbines and instability under winds and changes of atmospheric parameters.

This invention discloses a second medium for stable energizing of vorticity and zoned control of tornado-type flow with support of large-scale electrical power over a long time during the calm and insufficient winds. Such medium is a saturated steam introducing kinetic energy and heat along the height of the tower via staged system of quasi-tangential and upward steam jets. This energy complements the inlet wind kinetic energy, or replaces and exceeds it at the calm. The system of steam jets provides starting and augments airflow capacity giving minimum sizes of the tower. The saturated steam is taken instead of superheated steam for immediate partial condensing of the steam at contact with colder air in the zones of vortex airflow. The release of latent vaporization heat intensifies raise of vortex kinetic energy through high decrease of pressure in polytropic expansion process. Moreover, a peripheral layer of steam-air mixture has controlled intermediate pressure between higher ambient pressure and lower pressure of inside flow. This layer is supported by the steam jets, helical swirls along the zones of vortex flow and locks an inner air having lower pressure. It makes unnecessary the most stressed moving structures under high velocities of vortex core. In this invention are used only outside adjustable vanes near other zones under lower inlet velocities of the wind or sucked free air. It differs from unreliable placing into tower the long flexible valves facing high velocities of accelerated airflows, as the valves (16) in U.S. Pat. No. 4,935,639.

In the referred patents was not suggested a way to place a prime driver for power generation near the vortex core whirling with maximum velocity, and thus to increase radically an attainable electrical power and plant efficiency. In this invention a single flow-through electrical generator directly induces an alternating voltage near the vortex core. The generator replaces the conventional air turbines and generators, which are compatible only with low velocities of the secondary sucked airflow. Such generator can attain power adequate to excess power of the steam-enhanced tornado-type flow. That is two and more orders of magnitude higher than can attain today air turbine. The design of generator adapted to operation near the fast whirling vortex core differs from the known kinds. For instance, from the ionic, MHD, piston, and ferrofluidic generators of direct current as in U.S. Pat. Nos. 4,064,409, 4,242,591, 4,433,248 and 4,691,130, which can not work near the vortex core. The attainable power, efficiency and operation stability of the generator are augmented additionally via coordinated usage of kinetic energy of the forcing wind or steam jets before and behind the generator.

The conventional solar concentrators and atomic power plants, used in the referred patents for heat utilizing, are oriented on possibly higher initial thermodynamic parameters. Meantime, in this invention the outside heating and flashing of low-temperature water with further acceleration of steam jets into the zones of vortex flow is preferred because yields minimum stresses, sizes and quality requirements to a heating system. Moreover, the sucking abilities of the distanced tornado-type flow are used through water ties for water acceleration giving intensifying, additional decrease of sizes and auxiliary energy of the heating system. The swirling and separating abilities of the vortex flow also are used for recirculating and purifying of condensate precipitated from the swirled saturated air. This condensate is used for heating, recovery of heat losses of electrical generator into the heating system, and delivery of excess to the consumers. This differs from purifying and heating of additional water as in U.S. Pat. Nos. 4,452,046, 6,532,740 and 6,590,300. The correspondent raised losses of purified water after these processes can not be preferred at water deficit.

The negative safety effects of combining with atomic power plants using direct ties of tower with reactor where not accounted in U.S. Pat. No. 3,936,652 relating to convection tower. The vortex tower can suck radioactive media through these ties at reactor damage. It relates also to the fuel combustion near tower bottom, as in U.S. Pat. No. 4,935,639. Its combining with saturated air or vapor corrodes equipment and is chemically dangerous, as in U.S. Pat. Nos. 4,452,046 and 6,590,300.

The air heaters used inside the convection tower in U.S. Pat. No. 3,936,652 are not realistic for destroying vortex flow. Large number of air heaters or turbines near bottom, as in U.S. Pat. No. 3,936,652, also can not be preferable for vortex towers designed with usage of near-bottom wind as a vortex energizer, as in U.S. Pat. Nos. 4,452,046, 4,935,639 and 6,590,300.

Meantime, the design of heating system and storage can define the operational power output and cost for any vortex plant. Moreover, they define also the attainable power and annual operation time due to functioning of invented steam-enhanced vortex tower at the calm and insufficient winds. In this invention the preferred designs of the beating system alternatively installed as single or as compatible pair outside or distanced from the vortex tower are the following:

a field of low-temperature solar heaters with water heating reflectors and collectors sectioned for raise of attainable capacity, different from design of sectioned reflector in U.S. Pat. No. 4,135,493; the field can be supported and decreased via intensified and sectioned solar pond storing preheated surface water; condensers of thermal or atomic power plant having low vacuum, supported through water heating up in safe intensified heaters by gas exhausts of boilers at thermal plants, or by steam rejections of turbines, moreover such combining gives parallel power outputs of the distanced heat supplying plant and vortex tower connected through ties of heated water fastened by sucking vortex flow for intensifying of the heating process;

obsolescent thermal or atomic power plants receiving a sparing regime with decreased initial parameters 4 used for heating of water in safe intensified beaters for power generation in the vortex tower; a safe low-temperature atomic reactor placed under complementing and heat storing solar water pond; the reactor design is similar to pool-type reactor on freon in U.S. Pat. No. 4,755,352, or to LWR simplified due to low water temperature and increased specific heat rejection; water is heated in intensified safe heaters and supplied to distanced power generating vortex tower sucking heated water through the ties; steel or pre-coated tube surfaces in solar storage utilizing also geothermal or waste beat with salty agents. These modifications give the alternatives of separate preferred combining with steam-enhanced vortex tower. They give such new effects as all-weather starting-up and large-scale power generation over a long time, having alternatively any one or two compatible and complementing kinds of renewable, waste and secondary or initial heat source(s) that can be supported by storage of low-temperature heated water. The principal difference of this invention from the patent DE 3924968 A1 with extensive air convection tower is that in this invention are used the wind energy and the heat energy from any one or two compatible water heating source(s) just in one the same single vortex process with single flow-through electrical generator of high rated capacity located in the compact vortex tower with highly intensified vortex flow. In the patent DE 3924968 A1 the increase of total rated wind power or hydraulic power can be achieved only through simultaneous increases of the number of wind turbines, tower height and diameter, and water pumps, giving exceeding raise of the limited over-stresses of the tower walls and base. The inlet velocities of the ambient air sucked by vortex flow can exceed several times the limited by stresses maximum velocities of the near installed wind turbines. The solar heating of the air maid in the patent DE 3924968 A1 is low effective especially at peak loading because of low heat transfer to the air and absence of storage of the heated air. In this invention is heated, stored and used for flashing the water having relatively high heat transfer and specific heat value. The flashed steam gives high latent vaporization heat at low auxiliary demands.

For comparison it is reasonable to underline that no one combination of the decisions, compatible with wind vortex towers in the patents referred above, yields possibilities to start up and stably generate electricity without sufficient wind, without limiting moving structures under high air velocities and without limiting low-velocity wind turbine(s). They can not utilize large amount of heat augmenting power without violation of limited number of turbines or number of interconnected towers at the same site.

No one combination of the patents yields possibility to start up the vortex plant and stably generate electricity over a long time at the calm and insufficient winds. No one combination can give large-rating electrical power from a single compact generator, adequate to excess power of the steam-enhanced tornado-type flow and comparable with attained rated power of thermal and atomic units. No one combination disclosed the preferable modifications of large-capacity systems heating low-temperature water, intensified and compacted through water ties with sucking tornado-type tower and compatible with it as the single, or in the compatible pair complementing one to another. Just these features absent before are the principal novelties of the invented steam-enhanced vortex power plant.

BRIEF SUMMARY OF THE INVENTION

A steam-enhanced vortex power plant of invention functions under forcing by the wind that is supplementary supported, or replaced and exceeded at the calm, by kinetic energy and heat from a staged system of fast jets of saturated steam. At the calm and insufficient winds the rows of fast steam jets accelerate quasi-tangentially and upward the flows of the ambient air into the zones of tornado-type flow confined by an inner vortex channel of a tower. Thereby the system provides starting-up and large-scale electricity generation over a long time via conversion of excess kinetic energy concentrated mainly in a fast whirling vortex core. The system also controls flow stability and augments an electrical power during the sufficient winds.

The steam receives kinetic energy and heat through water heating and flashing with quasi-tangential and upward acceleration of the steam jets. The vortex process intensification is going under higher decrease of pressure and faster achieving of saturation phase of humidified and swirled air. The saturation leads to the most intensive conversion of the latent vaporization heat of the involved humid air and the injected steam into kinetic energy of vortex core. The strict process control is made via inlet air vanes and different change of performance of the steam jets in different vortex zones. This way is supported by electromagnetic means of control of power generation.

In a first preferred embodiment the steam-enhanced vortex power plant comprises: a vortex tower with a structure bearing a vortex channel with integrated functional units, a staged steam injecting system and a flow-through electrical generator with whirled magnetic concentrators; an outside heating system supplying heated water to different stages of steam injecting system; the systems supporting generation of electricity and recovering heat losses of electrical generator into heating system.

The tower structure has circumferential rows of streamline columns with rows of inlet adjustable vanes between them for omnidirectional winds or sucked stagnant air. The columns and vanes form rows of flexible air nozzles sucking and accelerating the inlet flows quasi-tangentially and upward through the air openings in the vortex channel. The columns are hollow and contain a system of rows of flash-off water drums integrated with accelerating steam nozzles. The accelerated steam jets have outlets into the vortex channel between the air openings. The stable pressure decrease is forming from ambient periphery of the tower to its central axis and upward along die vortex channel, involving and helical accelerating new masses of the ambient air which carry vapor with latent vaporization heat. Average inlet velocities of sucked air can exceed the average wind velocity possible at the site from several times up to one order of magnitude and higher dependent on controlled performance of the sucking steam jets.

The zones of vortex airflow forced by steam jets receive else several time higher tangential velocities. The higher located rows of steam jets humidify and accelerate the developing vortex airflow up to controlled level at which the swirled air reaches the saturation phase. The fastest whirling vortex core is forming at this stage. The core receives kinetic energy and latent vaporization heat concentrated after staged steam injections and sucking of the humid ambient air.

Further a surrounding trap separates and purifies a precipitating condensate moving under centrifugal forces to periphery of the whirl. Then a flow-through electric generator converses the kinetic energy of the vortex core. The spherical magnetic concentrators are injected quasi-tangentially and upward into a peripheral layer near the vortex core. The swirled concentrators turn their magnetic poles N radially under centrifugal forces and form an alternating magnetic whirl. The magnetic whirl crosses a flexible stator and induces three-phase voltage.

The higher located rows of steam nozzles create an ejection effect enhancing the electrical generator through support of the whirl of magnetic concentrators. Simultaneously these nozzles create a forcing effect for exhausting of the waste airflow through a top diffuser at the calm and insufficient winds. Thereby the steam and air nozzles located under and above the electrical generator create preferable conditions for stable operation of large-rating electrical generator over a long time. The water heating system has alternatively one or two compatible kinds of heat sources and can have regime, seasonal or off-season heat storage for starts and prolongation of annual operation time. The preferred modifications of the system, alternatively applied due to local conditions, are designed with respect to possibilities of their intensifying, compacting, and economy of auxiliary energy under vortex sucking through hot water ties.

The plant products electrical energy and delivers excess condensate separated from vapor of ambient air. In the second embodiment the steam-enhanced vortex plant is simplified for production of water and conditioned air. In the third embodiment this plant is additionally simplified for water production only. The analysis of the Prior Art and summary show the next principal novelties and advantages of the invented steam-enhanced vortex power plants:

1) Supplementing of the wind, replacing and exceeding of wind action along the zones of vortex flow at the calm and insufficient winds by kinetic energy and heat of staged system of fast jets of saturated steam. Replacing of the most stressed moving structures. That yields all-weather starts and large-scale power generation over a long time.
2) A single flow-through electrical generator with swirled magnetic concentrators, which can work near the fastest whirling vortex core and has attainable power adequate to excess power of the steam-enhanced tornado-type flow. Replacing of the limiting convectional air turbines and electrical generators.
3) Synchronous forcing and ejecting control of vortex flow before and after electrical generator via staged intake of fast steam jets, giving the highest flow capacity, stability, and minimum sizes of the tower.
4) Usage of low-temperature heating of water and sucking by tornado-type flow through water ties for decrease of sizes of the heating, steam injecting systems and auxiliaries.
5) Combined or separate production of pure water and conditioned air from the humid ambient air.

BRIEF DESCRIPTION OF THE DRAWINGS

FIGS. 6A–9B show a principal design of flow-through electric generator with whirled magnetic concentrators.

FIG. 6A, FIG. 6B are direct and left side views of magnetic concentrator (MAC) with cut-off half of two shells.

FIG. 9B is a stator arrangement with switched modules of three-phase conductors completing induction and control sections.

FIG. 12A, FIG. 12B and FIG. 12C are front, plane and left side views of the heating part of two-step solar heater.

FIGS. 15 and 16, 17 are the simplified plan and vertical sections of streamline site of vortex power plant with artificial circulation of the free air during the sufficient wind (FIG. 16) and the calm (FIG. 17).

Figure 1:
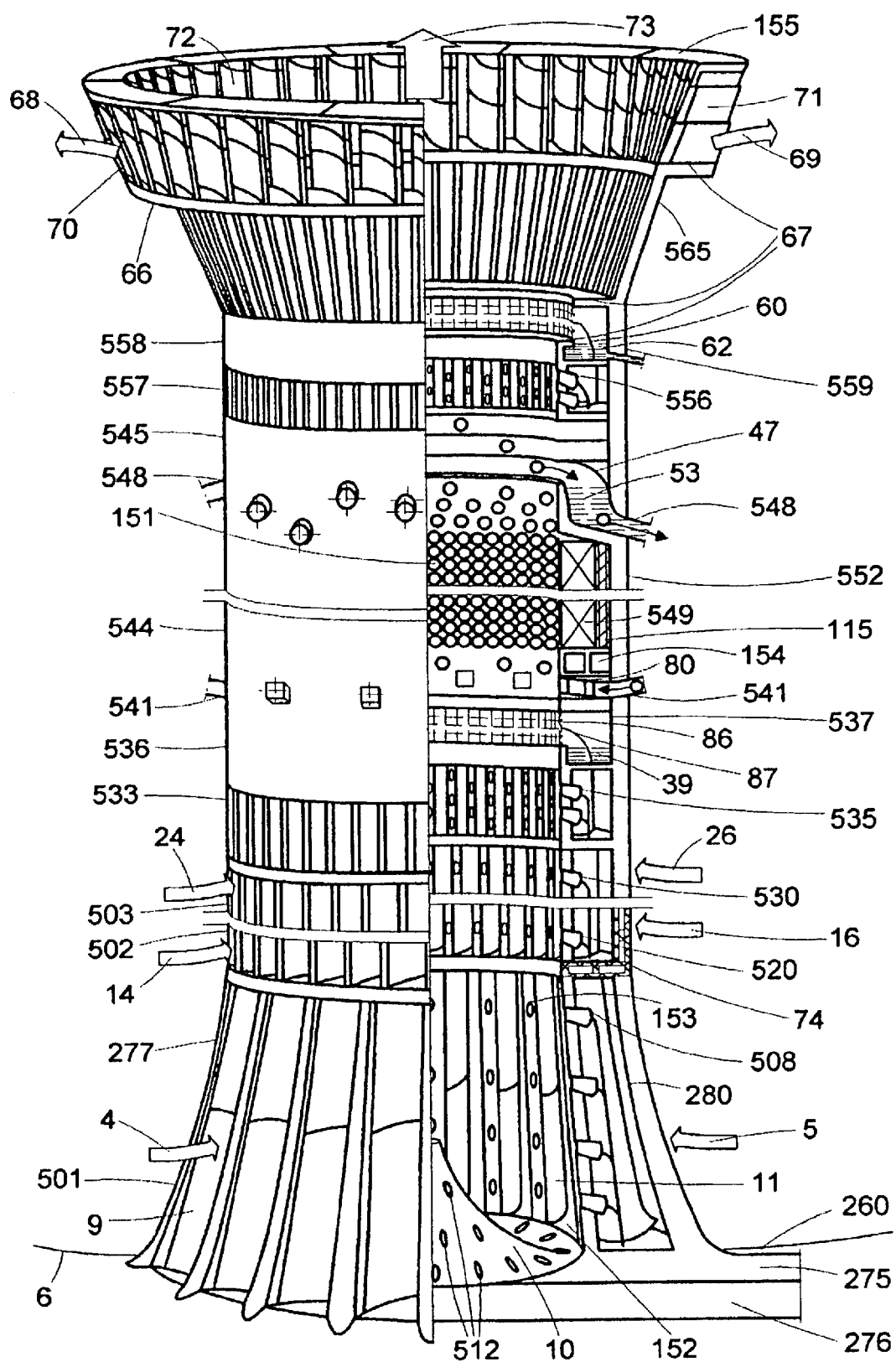
FIG. 1 is a general view of steam-enhanced vortex tower with positions of air vanes at the calm.

A left shady and weather side is accepted in the drawings. The hatch lines mean: open tower inlets and outlets in FIGS. 4, 5, 15–17; a magnetic flux in FIGS. 7A, 8A, 8B; a control section of stator in FIG. 9B; heating media and solar rays (smaller and larger pointers) in FIGS. 2, 11, 12A, 12B, 12C, 15–17, and air streams in FIGS. 16, 17.

DETAILED DESCRIPTION

Overview of the Plant and Process

A steam-enhanced vortex power plant of this invention uses the sufficient winds, heat and vapor of the involved ambient air, and supplementary kinetic energy and heat of a staged system of fast steam jets. During the calm and insufficient winds the action of the wind is completely replaced and exceeded by action of this system along of the zones of tornado-type flow. The circumferential rows of fast steam jets suck, humidify, heat, and accelerate quasi-tangentially and upward the flows of ambient air into a circular vortex channel inside a bearing tower structure. The system energizes, intensifies and coordinately controls the zones of tornado-type airflow along the vortex channel. Thereby the system provides all-weather starting-up and large-scale power generation over a long time during the insufficient winds and calm. During the sufficient winds the system also augments an electrical power and controls stability of the process.

Such all-weather contribution of the steam injecting system increases the annual operation time and electricity outputs received as superposing of shares of the energizing wind and steam kinetic energy supported over a long time by one or two compatible source(s) of low-temperature water heating and storing. The intensification of vortex process is going under faster achieving of saturation of the swirled ambient air. The saturation leads to simultaneous conversion of the accumulated air heat, steam kinetic energy and heat mainly into kinetic energy of vortex core, similarly to the process in the natural tornado. Both these natural and artificial vortex processes realize the polytropic expansion process under raising decrease of pressure and temperature. The strict control of the vortex process is made via different changing of vectorial velocities, inlet pressure, temperature and mass rates of the steam jets in the different zones of the vortex airflow. The control is enhanced by coordinated action of the steam jets before and after an electrical generator. This way is supported by inlet and outlet air vanes and via electromagnetic means of control of power generation. Every next row of the steam jets provides increased velocity and reduced pressure and temperature to raise the pressure decrease, humidity and angular momentum along the vortex flow. The stable pressure decrease is forming from ambient periphery of the tower to central axis and upward along the vortex channel, involving and helical accelerating new masses of the ambient air carrying vapor containing the latent vaporization heat. Average velocities of the sucked inlet air can exceed the rated average wind velocity from several times up to one dimension and higher dependent on controlled performance of the steam jets. The system of steam jets together with sucked, mixed and accelerated air creates a fast helical swirling peripheral layer. The layer transfers angular momentum and heat to the center and upward under augmented pressure decrease along the zones of vortex flow. This layer serves as air sucking, then forcing and locking curtain for swirled inside air having relative vacuum, at opened air nozzles having higher pressure. The steam nozzles inject faster steam jets at controlled intermediate pressure level between outside atmospheric pressure and inside air relative vacuum. This makes unnecessary the most stressed moving structures under high velocities near zone of vortex core. Only outside adjustable vanes are used near other zones under lower inlet velocities of the wind or sucked air. The peripheral steam kinetic energy and heat converse into kinetic energy and heat of the air inside the vortex channel. Thereby the peripheral and inner layers of airflow receive else several time higher tangential velocities. The highest row from the rows of the inlet air vanes is shut at the insufficient wind and calm. The relating rows of the steam jets humidify and accelerate the developing vortex flow up to controlled level at which the swirled air reaches the saturation phase. A fast whirling vortex core is forming at this stage. The core utilizes kinetic energy and latent vaporization heat concentrated after staged steam injections and after involving of the ambient air containing the water vapor. Further a surrounding trap separates and purifies a precipitating condensate moved by centrifugal forces to periphery of the vortex channel. The condensate is recirculated for heating and flashing, cooling of electrical generator with recovery of generator heat losses, and excess delivery to consumers.

Then a flow-through electrical generator converses the kinetic energy of the vortex core into electricity. The spherical magnetic concentrators are injected quasi-tangentially and upward into a peripheral air layer near the vortex core. An injected universe of the magnetic concentrators receives angular momentum from this layer having intermediate tangential velocities. In its turn, this layer receives angular momentum from the fastest whirling vortex core. Every whirling magnetic concentrator orients its magnetic pole N radially under centrifugal force thus forming an alternating magnetic whirl together with all whirling magnetic concentrators. The magnetic whirl crosses a flexible stator and induces the three-phase voltage. The stator is made of switched modules of three-phase conductors cooled by separated condensate. The condensate is delivered into the outside heating system for recovery of heat losses of the electrical generator. After heating up the condensate is recirculated into the stages of steam injecting system under sucking action of the vortex flow.

The magnetic concentrators after helical whirling in the generator are separated and sorted by another trap. This trap is partially filled by another portion of the separated condensate for recovery of residual kinetic energy of concentrators. They are injected again into generator after maintenance of part of them. The higher located rows of the steam nozzles create an ejection effect enhancing the generator via support of the whirl of magnetic concentrators. Simultaneously these steam nozzles create a forcing effect for exhausting of the waste airflow through a top diffuser at insufficient winds and calm. At sufficient winds the relating row(s) of air vanes is open from the upwind side. It creates the similar wind effects, together with ejecting wind effect created by adjustable outlet vanes of the top diffuser.

In the first embodiment the steam enhanced vortex power plant preferably comprises (FIGS. 1–4):
a wind vortex tower with spatial system of circular rows of steam nozzles as 507, 508, 512, 517–520, 527–530, 534, 535 accelerating jets of saturated steam as 7, 8, 12, 17–20, 27–30, 34, 35, circular rows of inlet air nozzles accelerating airflows as 4, 5, 13–16, 23–26, a condensate separator 536, a flow-through electric generator 544 with whirled universe of magnetic concentrators as 151, and exhausting units with similar rows of steam nozzles as 555, 556 accelerating steam jets as 55, 56 and air nozzles in a re-enhancer 557, a second condensate separator 558, and a diffuser having several stages as 565; 66, 67; 70, 71; a heating system 81 giving hot water 222 to flash-off drums as 84 integrated with steam nozzles and having circulation 83. The system can have alternatively one or two compatible kinds of heat sources with regime, seasonal or off-season storage (For instance, in FIG. 2 are used two-stage solar heaters with water heating reflectors as 169 and collectors as 170, and storing solar pond 167 with back-up heaters having alternatively waste, initial geothermal heat source 85);

the systems for maintenance of magnetic concentrators 75 and for magnetic water treatment 78 with recovery of heat losses of generator into heating system 81 by recirculated condensate through controlling water pumps as 54.

The steam-enhanced vortex power plant supports large-scale tornado-type airflow via kinetic energy and heat of the jets of saturated steam or wind. The airflow comprises the following steam-enhanced zones (FIGS. 14, 15–17):

meridional sucking of the free air with initial acceleration over a streamline surface 6 of a central zone 260 of site with central located vortex tower with vorticity energizing 1, vortex flow acceleration 2, 3, 33, vapor condensation 36 with forming of the fastest whirling vortex core, injection 41 and swirling 43 of universe of magnetic concentrators as 151, centrifugal passing of the whirling concentrators into peripheral layer 42 of vortex core and radial orientation of their poles N, power generation 44, separation 45 and sorting 46 of the concentrators, re-enhancing of waste airflow 57, the same with vapor condensation 58, staged deceleration of airflow as 65, 72 in diffuser: side and central exhausting as 68, 69 and 73.

The steam-enhanced vortex tower comprises a strengthened tower-base structure 74 bearing a vortex channel 280, and the functional units surrounding the channel. The tower-base structure comprises: an ensemble of airfoil-type columns as 277 born by radial foots as 275 on ferroconcrete ring 276; a cylindrical middle part 278 bearing vortex swirling structure and electrical generator 544; a cylindric and widened top part 279 forming an adjustable exhausting structure 281, 282. The columns as 277 bear circular frames with outside streamline covers, carrying and strengthening the functional units of the tower. The functional units are the following:

1) A vortex energizer 501 that energizes and develops vorticity in the vortex channel 280 and comprises:
   a) A peripheral row of the columns as 277 with at least one row of inlet adjustable vanes between them as 9, 11 for omnidirectional winds as 4 at opened vanes from an upwind side, or sucked stagnant air as 4, 5 at all opened vanes. The columns and vanes form the air nozzles accelerating the inlet airflows quasi-tangentially and upward through air openings as 152 in the channel. The columns are hollow and contain rows of flash-off drums integrated with steam nozzles as 508. The drums receive heated water and flash-off a saturated steam through the nozzles accelerating the steam quasi-tangentially and upward through outlets as 153 into the channel between the air openings as 152. The jets suck and then force the free air.
   b) A concave cone 10 at the center of the bottom. The cone is hollow and also contains the flash-off drums flashing the steam through the nozzles. The nozzles accelerate quasi-tangential steam jets through outlets as 512, and upward steam jet(s) at the top of the cone 10.
   c) The slots at inner surfaces of the energizer 501 collecting condensate after partial steam condensing with shearing the colder air. The released latent vaporization beat intensifies vorticity development and raises flow capacity.
2) At least two upper swirlers as 502, 503 having vertical columns with rows of quasi-tangentially accelerating air nozzles and steam nozzles as 517–520; 527–530. Every subsequent swirler has vanes of smaller sizes for inlet airflows of increased velocity as 24, 26, and injects steam jets of higher velocity and lower pressure and temperature. Thereby are supported decreases of pressure and temperature and reliable control of vortex flow of increased power along the zones of the vortex channel.
3) The upper of these swirlers 533 that has the lowest sizes of the inlet air vanes shut at the insufficient winds and calm. The relating rows of the steam nozzles as 534, 535 provide the fastest quasi-tangential steam jets that develops vortex flow up to the controlled level. At this level the swirling flow reaches the saturation phase and forms the fastest whirling vortex core. At the sufficient winds the inlet air vanes are opened at the upwind side, and the steam jets have minimum mass flow rate necessary for control of stability of the vortex core and for augmenting of the generated electrical power.
4) A separator of condensate 536 using droplet and filament centrifugal effects in the saturated vortex core. The unit comprises: a circumferential trap 537 with inner opening for condensate; a grounded steel grid 86 at the opening, the grid integrates replaceable water filters; a circular airfoil 87 dividing through the trap on warmer and cooled parts; two circular concentric reservoirs 38 and 39 at a bottom of the trap for condensate of different temperatures. The outside pumps as 40 control the levels of condensate in the reservoirs against of the vortex sucking force.
5) A flow-through electric generator 544 with whirled magnetic concentrators converting kinetic energy of the vortex core into electricity.
6) A re-enhancer 557 of waste airflow that has air vanes, flash-off drums and steam nozzles as 555, 556 similarly to the swirler 533.
7) A second separator of condensate 558, similar to the first separator 536, with trap 559, dividing panel 60, grid 88, pools 61, 62 and pumps as 63. The separator intensifies ejection and forcing action of the re-enhancer 557. The condensate from the cooler pool 62 cools of the stator of generator and damps separated MACs in the pools as 53.
8) A top diffuser has gradually and abruptly expanding parts as 565 and 66, 67, adjustable telescoping vanes as 70, 71 control the side airflows as 68, 69, and retractable top airfoils as 155 that form a wind-and-power operated cowl 72 controlling an upward airflow 73. The diffuser increases pressure for reliable exhausting of the airflow 73. The adjustable vanes and fins create also the ejection effect from the upper sufficient wind after turning the cowl to the lee-side as 281 in FIGS. 15, 16. During the calm the cowl has maximum height as 282 in FIG. 17. Such flexible design augments plant power and decreases usage of steam and source(s) of heat.

The outside steam injecting system directs accelerated steam jets into the zones of vortex channel and comprises (FIGS. 1, 4) the rows as 584 of flash-off drums with steam nozzles and piping forming the hidden circumferential rows along the channel and having circulation as 83. The nozzles have stretched ellipsoidal openings through wall of the channel. Every row has subsystem controlling performance of the steam jets.

The outside system injecting magnetic concentrators (MACs) into electrical generator comprises (FIGS. 1, 9):
a) At least two circumferential layers of batching bins with two types of MACs, and quantitative controllers located at different heights, which provide different types, quantity and velocities of MACs.

b) Descending tacks for acceleration of MACs under their weight with further ascending as 41 for upward quasi-tangential injection supported by sucking from the vortex core.

c) A circumferential ring(s) as 80 injecting and swirling MACs in the zone 43. The ring(s) is hollow, has rhombic cross-section, and chocks airflow via inlet and outlet tight blinking doors as 118. Bulkheads having adjustable concave form divide the ring(s) and direct the MACs. Every inlet door is opened by a next passing MAC at preliminary shut outlet door, and for a verse. The units are made of non-magnetic plastics covered with smooth rubber blocks cooled by the recirculated condensate.

The outside system removing out the magnetic concentrators comprises their separator 545 and maintenance system. The separator of MACs comprises (FIGS. 1, 4):

a) 8 circumferential trap 546 with an inner opening for centrifugal removing of MACs as 46;

b) panels as 47 dividing trap at least on three concentric parts for rough sorting of on-line, partial operable and damaged MACs, according to weight and eddy drag of outer shell giving different trajectories;

c) impingement plates at inner trap walls, made of water-cooled shock-absorbing rubber blocks and, together with braking bottom pools as 53, damping residual kinetic energy of sorted MACs, converting it into heat energy of condensate then directed by pumps as 54 into heating system 81 for heat recovery;

d) bottom openings for MACs leading into channels for removing out of the sorted MACs.

The unit is made of smooth fiberglass laminate with water-cooled rubber blocks.

The outside maintenance system supports MACs in operable state and uses worked-out MACs for magnetic treatment of condensate 78. The system comprises the subsystems and units as 75 for supply and removal of MACs, superposed magnetization, maintenance of the plastic shells or replacement of the destroyed shells of MACs. The subsystems are integrated into an external track with downward spiral motion of MACs under their weight together with condensate around the structure of electrical generator 544. The system, except of magnetization unit, is made of the water- and shock-resistant plastics and water-cooled rubber blocks.

The overview above is completed below by description of the preferred flow-through electrical generator, modified heating system interacting with tornado-type tower, plant starts, functioning and switching out.

Electrical Generator (FIGS. 1, 3, 4, 6–10)

Figure 7A:
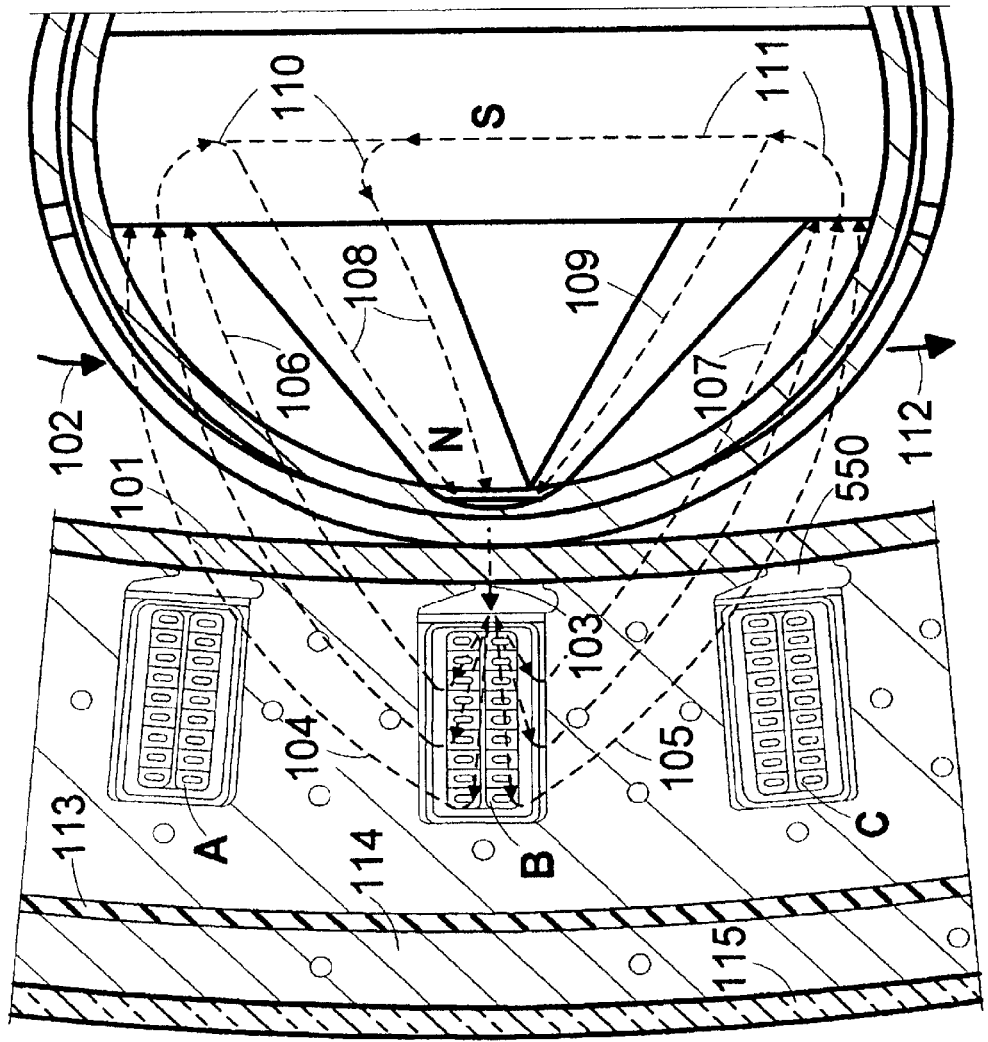
FIG. 7A, FIG. 7B are scheme and schedule of three-phase voltage induction by initial magnetic field of MAC.
Figure 7B:
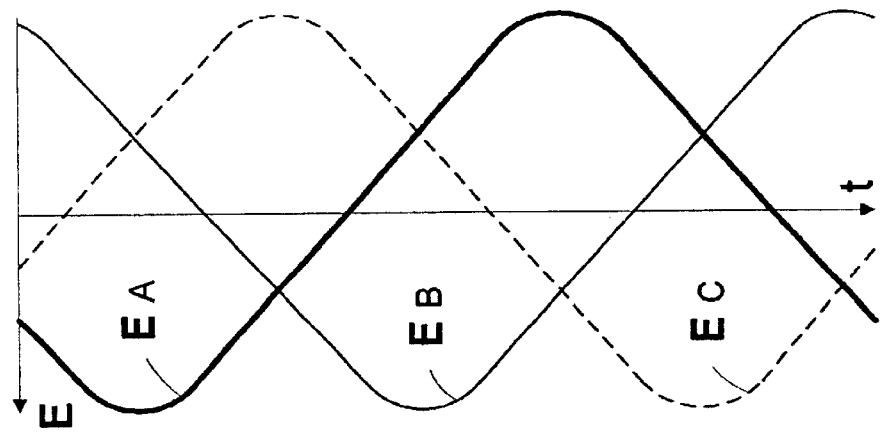
Figure 8A:
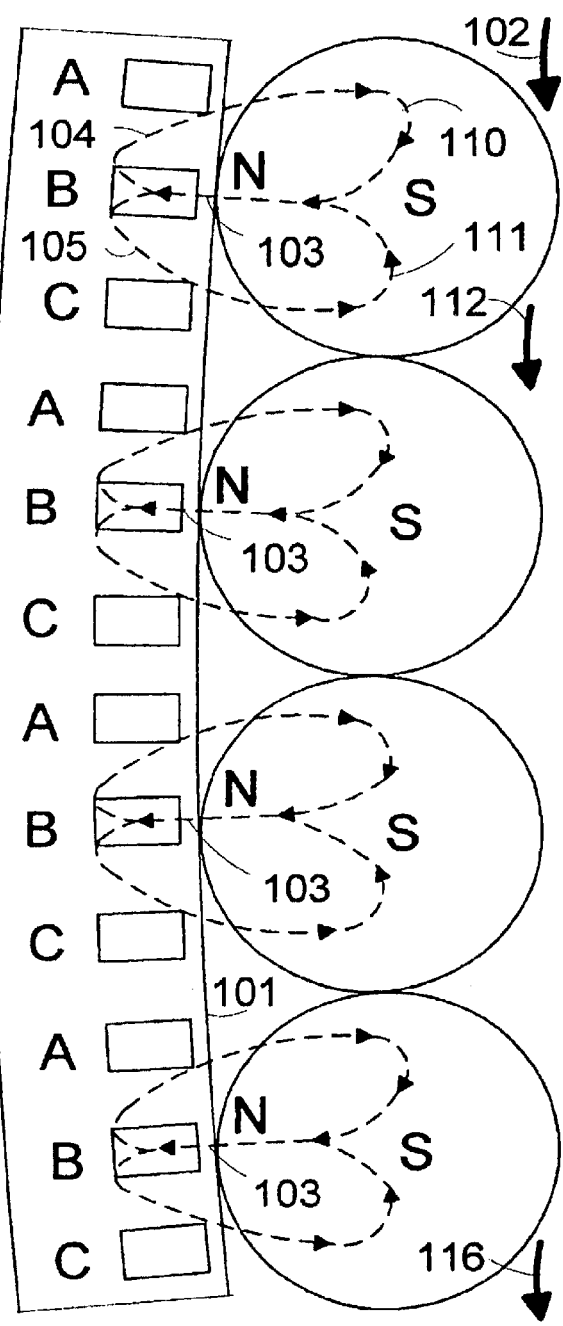
FIG. 8A, FIG. 8B show fragmentally the horizontal and vertical duplications of voltage induction by MACs.
Figure 8B:
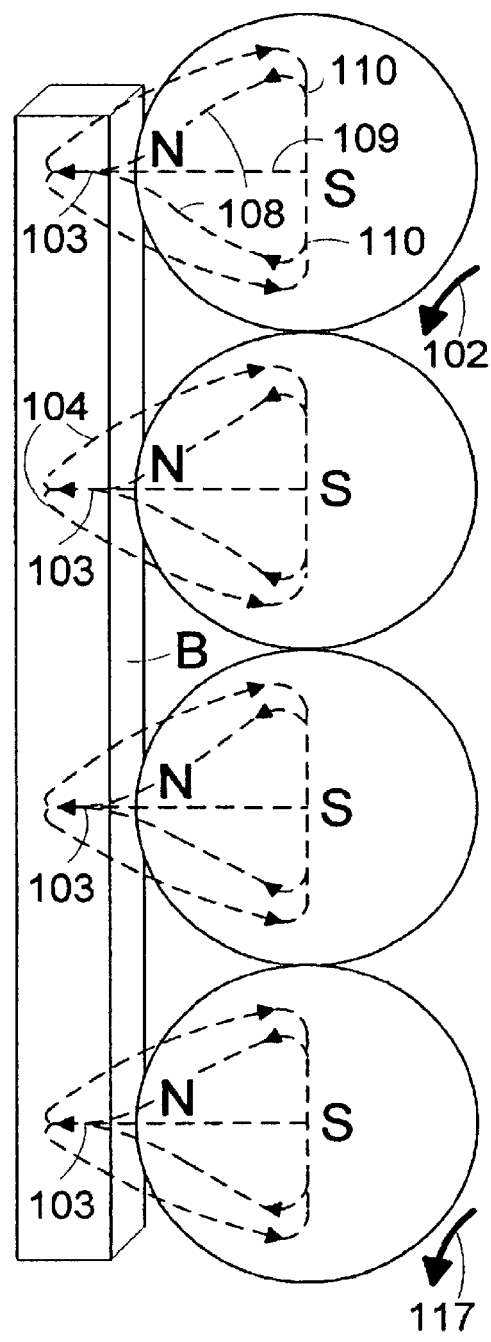
Figure 9B:
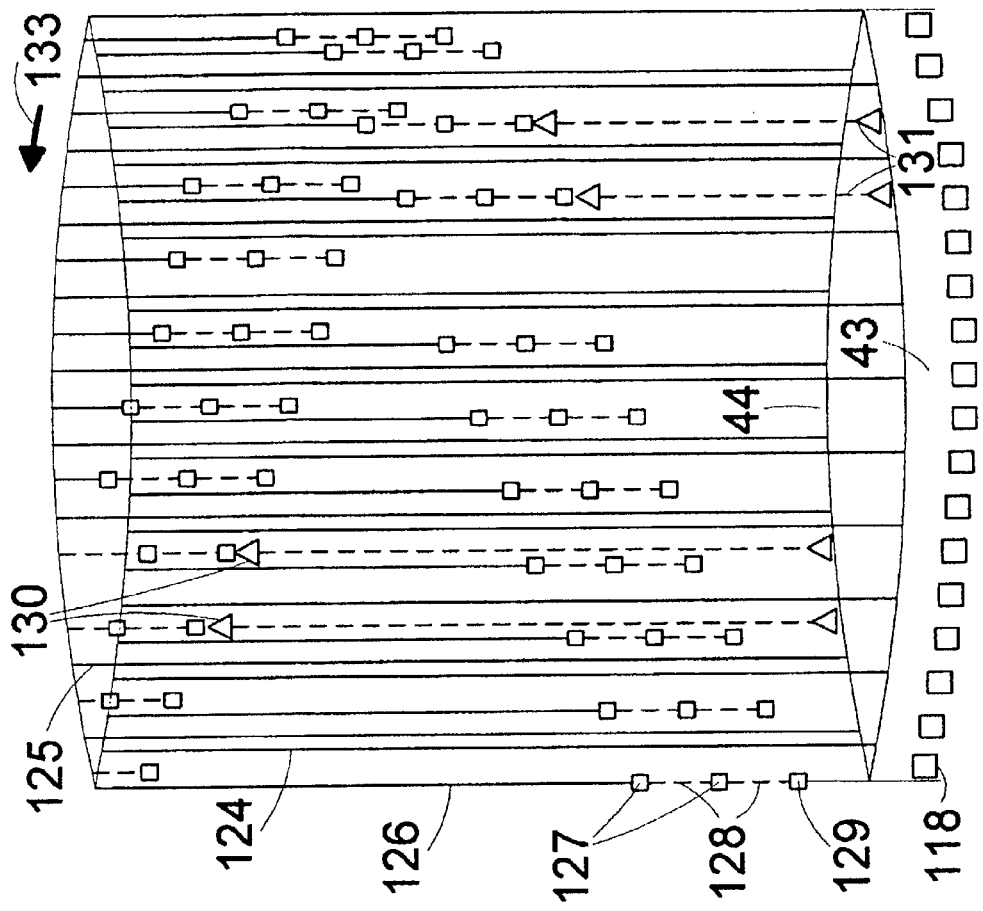

A flow-through electrical generator uses an universe of magnetic concentrators (MACs) whirled by column vortex airflow near circumferential three-phase conductors. Every three adjacent different-phase conductors are crossed through in series by magnetic flux of whirled magnetic concentrator orienting magnetic pole N radially (FIG. 7A), and every following whirled magnetic concentrator (MAC) repeats the process (FIG. 8A). The MACs whirled higher and lower of the MACs mentioned above duplicate induction process in these conductors (FIG. 8B).

Figure 3:
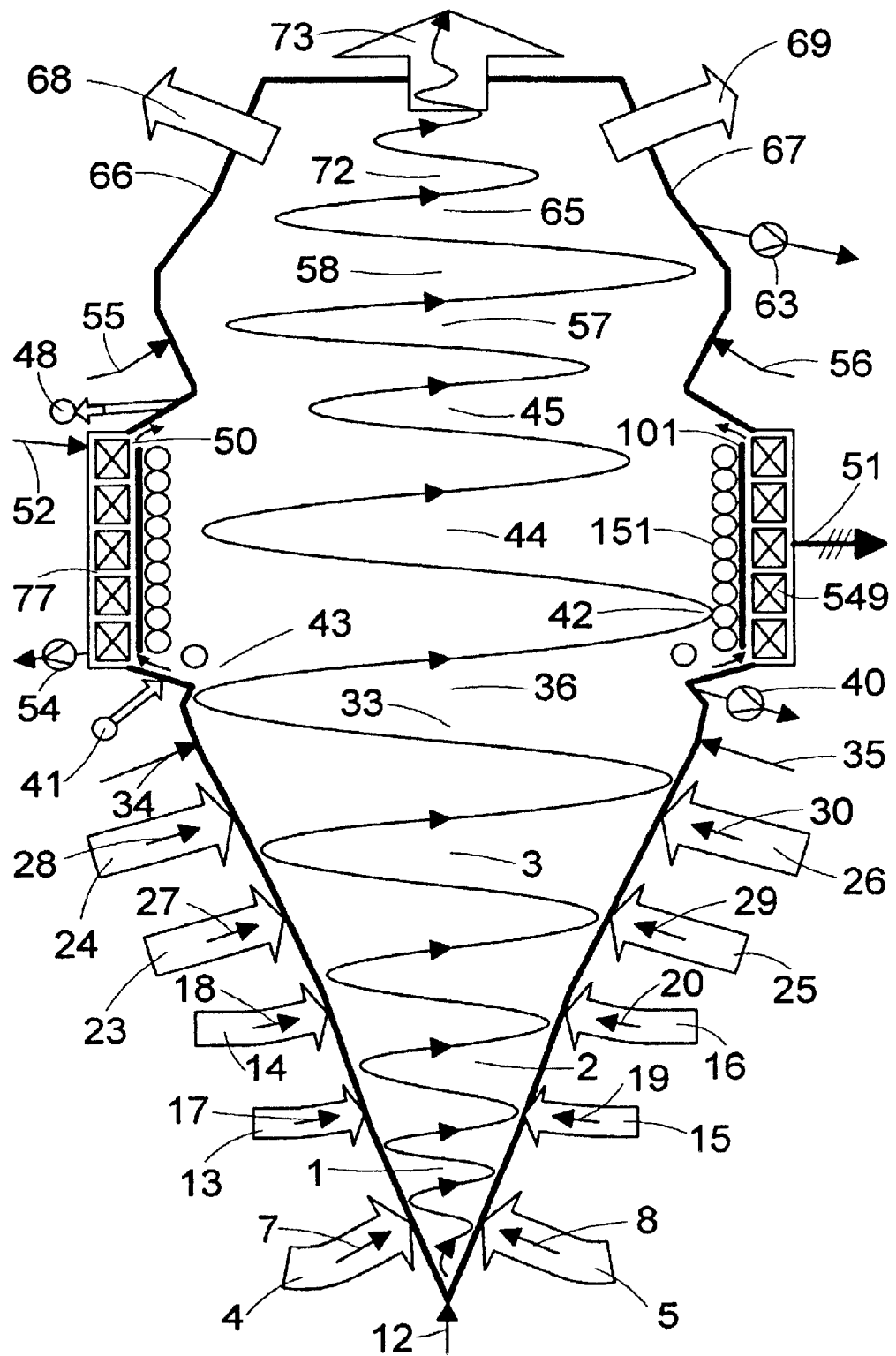
FIG. 3 is a conditional pattern of steam-enhanced vortex flow at the calm. Thick and thin hinges show the magnitudes of mass flow rate and tangential and axial velocities changing along the axis of the flow.
Figure 4:
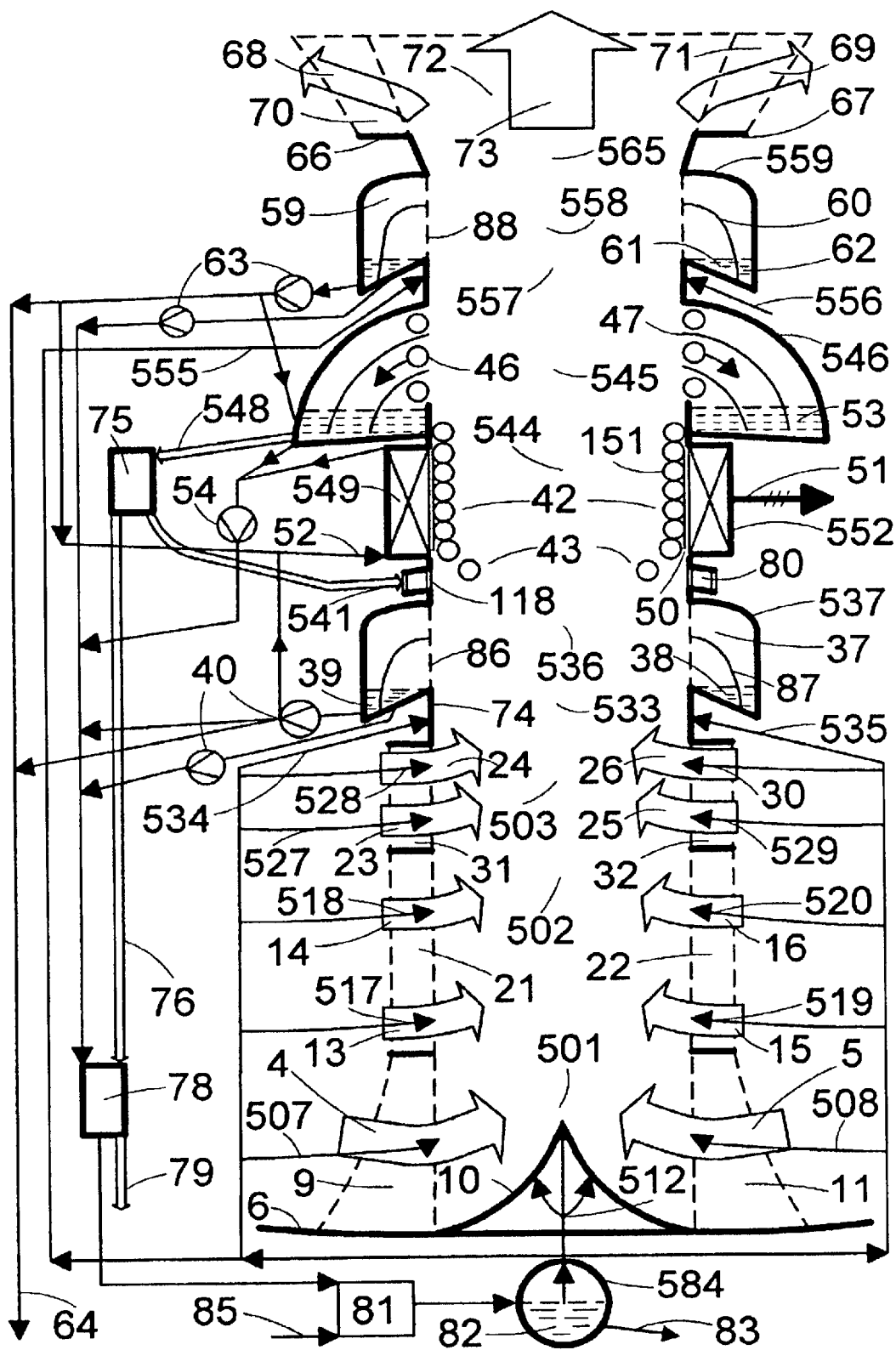
FIG. 4 is a schematic layout of steam-enhanced vortex plant producing power and water at the calm.
Figure 5:
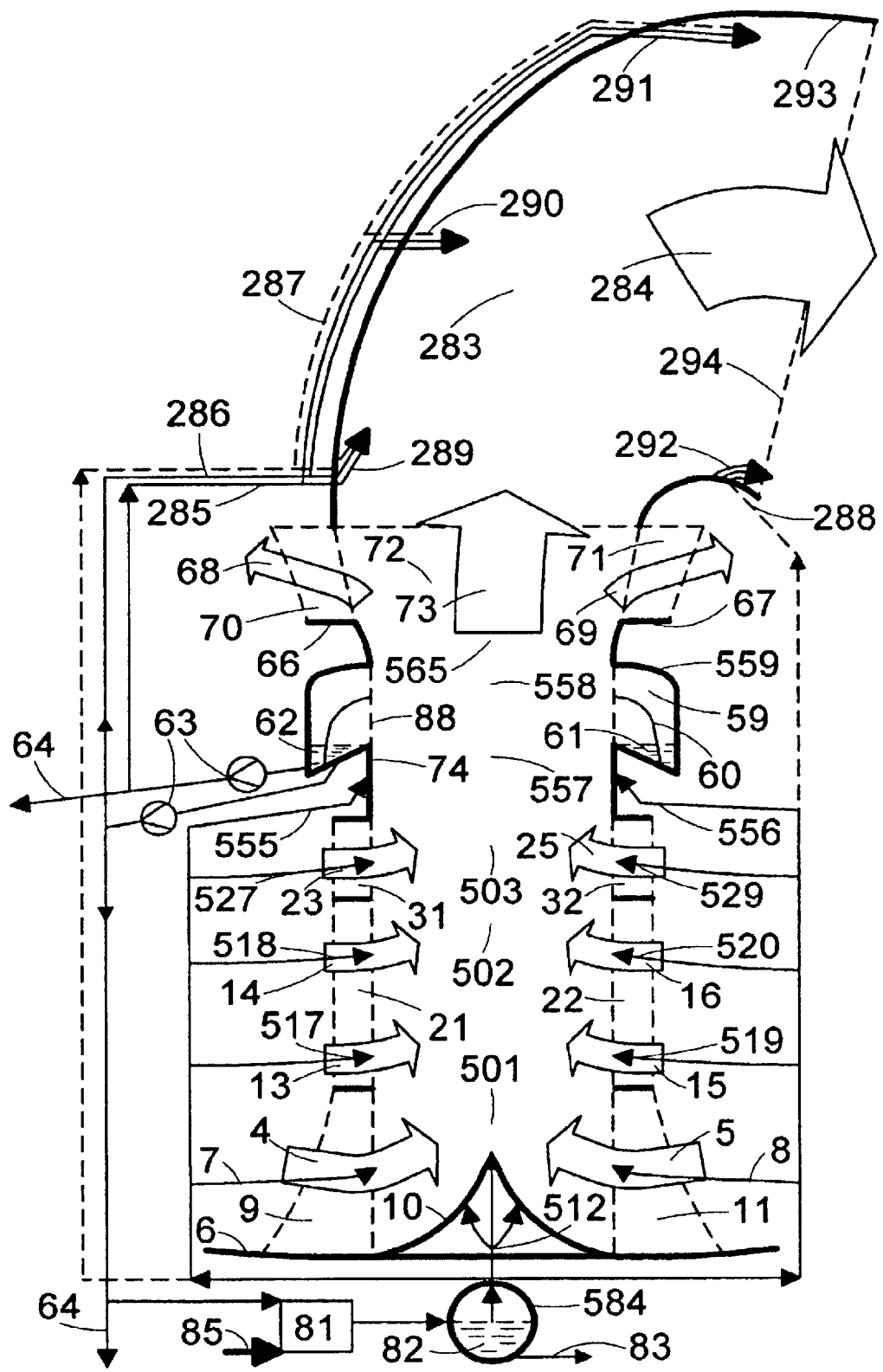
FIG. 5 is a schematic layout of simplified vortex plant for producing of water and directed conditioned air.

An alternating magnetic whirl can occur in the zone of power generation 44 during action of tornado-type airflow (FIGS. 3, 4). The airflow carries synchronously an injected and swirled universe of MACs as 151 via tangential, axial, and radial centrifugal forces thus inducing alternating voltage in the conductors of cylindric stator. These driving forces overcome braking magnetic forces that secondary induced in the stator, and also repulsion magnetic forces, friction, and sucking meridional forces under lower pressure in the center of vortex core. Thereby vortex kinetic energy is transformed into kinetic energy of MACs, and further converted into electrical energy. The velocities of vortex flow as 102, 117 and 112, 116 exceeding velocities of MACs are showed in FIGS. 8A and 8B. A quantity of the circular duplications, or polarity of alternating magnetic whirl, is an integer quotient after dividing of length of inner circle of the stator on sum length of a segment formed by three adjacent slots for conductors and three interim teeth of magnetic core of the stator (FIG. 7A, SA).

The electrical generator 544 comprises (FIGS. 1, 3, 4):

1) Flexible three-phase stator conductors 549 sectioned with independently switched and cooled modules.

2) A switching system 154 that makes operational, failure, or emergency switches of the modules.

3) Conventional high-permeability core of stator, frame 114 and wave absorbing covers 113 and 115.

4) A wall 101 of vortex channel, resting on circular stator on the inside and detaching the stator from the vortex flow.

5) An universe of injected and swirled MACs as 151 carried by peripheral layer 43 of the vortex core.

6) A system cooling stator by insulated tracks of condensate, and by air that bypasses the vortex zone 44.

During action of tornado-type flow, the fastest whirling vortex core with the coldest air transmits kinetic energy to the peripheral layer with MACs and recovers their heat into core kinetic and thermal energy, after magnetic interaction and after friction between whirling universe of MACs and wall 101. The magnetic whirl can last until the carrying forces overcome the braking forces controlled via velocities of peripheral air layer 42 and MACS. Correspondent limiting curves d are showed in FIG. 10. The sucking forces of the vortex core under the pressure decrease protect the wall 101, stator and MACs from excessive stresses under centrifugal forces of MACs. The stresses are reduced also via contrary action of secondary induced stator magnetic field, and via flexible design of MACs having two sliding protective shells. Enough tangential velocity of the layer 42 is provided via even performance of core, limitation on diameters of channel and MAC, and periodic support of their smoothness.

The magnetic concentrator (MAC) preferably comprises (FIGS. 6, 7):

a) A jointed magnet made of a high-permeability ring 89 and three symmetrically converging permanent magnets as 90, 91, 92 focusing maximum flux density in an outer zone 103.

b) A profiled magnetic enhancer 93 with a through hole 94, enhancing flux density in the outer zone 103.

c) A spherical shell 96 smooth on the outside, made of fiberglass laminate, attaching fixedly the jointed magnet with enhancer 93 and resting on the ring 89 having diameter equal to inner diameter of the shell.

d) An outer two-side smooth spherical shell 97 made of fiberglass laminate, which protects the shell 96.

e) A partial gap 95 between shell 96 and enhancer 93, slackening stresses of the enhancer 93 and shell 97.

f) A free air gap 98 between the nested shells 96 and 97, and ventilation holes as 99, 100 in the shell 97. A gravity center of MAC is located out of geometric center of shell 96, between the enhancer 93 and ring 89 on an axis of the magnetic flux. It gives centrifugal radial orientation of magnetic pole N at whirling of MAC.

A center of the outer zone 103 of the magnetic flax is distanced from the enhancer 93 and can match with center of cross-section of the nearest conductor at MAC whirling.

The zone 103 has effective width and depth equal nearly to sizes of the crossed through phase conductor (FIG. 7A).

The permanent magnets and rings of MACs are made preferably of the following materials:

at least two types of MACs with different laminated hard-magnetic plastics having higher and lower permanent magnetization and weight, and ring made of reinforced high-permeability plastic, for generators of minimum and intermediate rated capacity; a neodymium-boron-iron laminated alloy having higher permanent magnetization and weight, and ring made of silicon laminated steel, for generators of larger and maximum rated capacity; one of hard-magnetic laminated plastics used at partial power loads, with ring made of reinforced high-permeability plastic, for the same generators.

The alternating magnetic whirl and flexible stator are characterized by the following details (FIG. 6-9):

(a) The main direct fluxes as 108 and 109 of every MAC superpose into concentrated outer zone 103. An outgoing side of magnetic wave 104 is distancing from the conductor phase A during passage of MAC. Simultaneously it is starting to cross the phase B. An incident side of magnetic wave 105 is outgoing from the phase B and then is starting to cross the phase C. The concentrated waves as 104, 105 are locking through back magnetic fluxes as 106, 107. Then are going distributions as 111 and superposing as 110 in the ring and magnets of MAC.

Figure 9A:
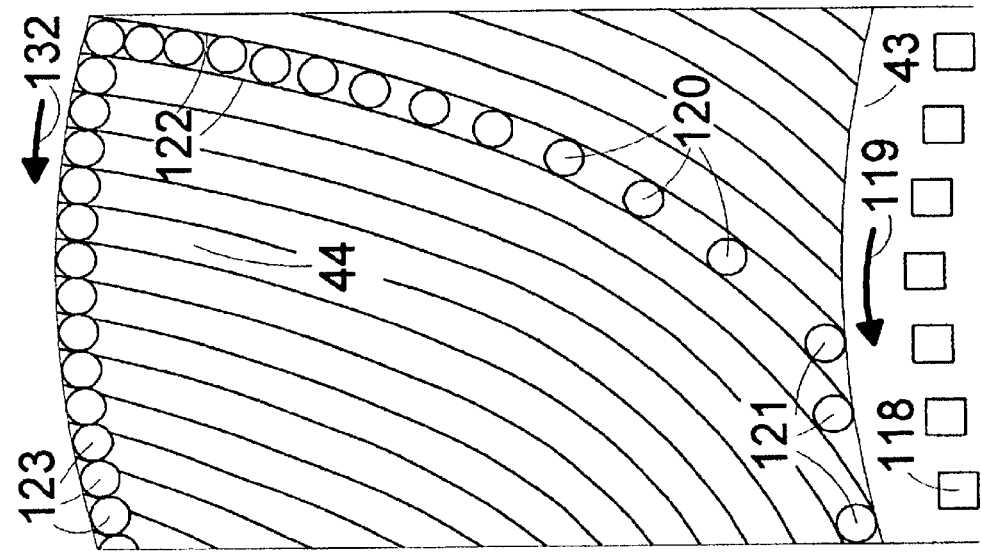
FIG. 9A is a fragment of universe of the injected, swirled and then loaded MACs near the back stator wall.

(b) In FIG. 9A a schematic fragment of the universe of MACs is shown as a moving chain assemblage, such as a chain 120 going from the blinking door as 118 through injection zone 43 till generation zone 44. Such chains are moving between every two conditional curves with inlet ends as 121 in the injection zone 43. The chains create close concentrated peripheral layer of MACs as 122, 123 in the generation zone 44. Such layer has high rotatory inertia and creates synchronous interaction of MACs with one-named conductors. It is provided via coordinated sizes of three conductors and one MAC (FIG. 7A) and via synchronous stator magnetic field with frequency control supported by the electrical power system.

(c) The MACs reduce the tangential velocity of vortex core from controlled inlet velocity 119 down to middle and outlet velocities 132 and 133 (FIG. 9). The given frequency, voltage and capacity are supported via number of rows of MACs as 123 by control of dynamical balance between the inlet, outlet and working quantities of MACs in the zone 44. The same is made via coordinated lengths and quantities of switched-on in series and in parallel modules of conductors as 127–130.

(d) A near-wall quantity of MACs in every horizontal cross-section against the modules as 128 (FIG. 9), and rated inlet and outlet quasi-tangential velocities of MACs, are correlated with parameters of stator arrangement. An interaction of stator and whirling against MACs depends on air velocities as 102, 112, 116, 117 (FIG. 8). Every three adjacent phases of conductors are in direct electromagnetic interaction with the closest passing MAC, and all one-named conductors have the same state of total electromagnetic field.

(e) The stator comprises the next sections distributed uniformly along an inner stator wall (FIG. 9):

(e') An induction section having the groups of full length equal to stator effective height, as 124 and 125, and connections with independent switches. Every such group is banked with a discrete step increased nearly in inverse proportion to square of the rated decrease of tangential velocity of MACs.

(e") A main control section which supports frequency 50/60 Hz under decreasing kinetic energy of MACs and airflow after partial conversion into electrical energy along the stator height. For control is used a vectorial difference between the airflow tangential velocity with aerodynamically forced deceleration from carried MACs, and the lower tangential velocity of MACs with magnetically forced deceleration. In accordance with the rated decrease of the tangential velocity of MACs, the groups have partial rated lengths with series rated decrease down to minimum. For instance, a group with close to full length 126, and shorter groups along flow velocity direction 133. The decrease is provided via quantity and length of the modules. Every group has a permanent part, and a changeable part showed by a dash line, as modules 128 with outside switches 127 and 129. The changeable part has modules switched during operation, due to performance of the magnetic whirl and airflow. A sum length of the induction and control sections raises inversely to square of decrease of operation tangential velocity of MACs along the stator height. The permanent part supports the given frequency under rated conditions and state of the electrical generator. The changeable part provides the same under changes of airflow performance, load, and state of generator leading to change of quantity, velocities and rows of whirled MACs. Every switched-on group is passed with MACs the same number of times per minute proportional to divisor of 3000/3600 revolutions per minute.

Every controlled module is crossed synchronously by outer zone 103 of concentrated magnetic flux of every MAC at individual height, as the modules 128 (FIG. 9). The induced phase voltage and current of every module are superposed synchronously into summary phase voltage and current, relatively via series and parallel connections of the phase modules. A characteristic of power control via change of length of switched-on modules, type and quantity of MACs is showed in FIG. 10. Plots a, b, c and s relate to minimum, middle, maximum and peak equivalent length. Plots 1, 2 relate to heavy and light MAC types at their velocity lower constraint d.

(e''') An additional control section comprising groups with partial lengths completing the partial lengths of the main control section, as the groups 130, 131 (FIG. 9). This section is using any variants of separate or common fast switching of modules leading to changes of secondary magnetic field of stator interacting with MACs. Partly, the variant of full switching under the hardest rated situation, providing fast vortex acceleration or deceleration via decrease or increase of stator braking force acting on MACs, together with fast change of steam injection and inlet airflows. The switching-on can replace the failed modules and is used for peak loading at surplus wind or solar radiation (See s in FIG. 10).

The switching system 154 comprises outside transfer hitless switches having water-cooled connections with modules for their parallel cooling giving lower temperatures relative to conventional series cooling.

Water Heat System

A heating system 81 has intensified heat transfer under higher temperature difference at low temperatures of heated water, and under sucking by distanced vortex flow through direct water ties from the system to supplied units of the vortex tower. Such usage augments capacity of heaters and reduces auxiliary energy via support of higher water speeds by sucking forces of vortex flow.

Figure 11:
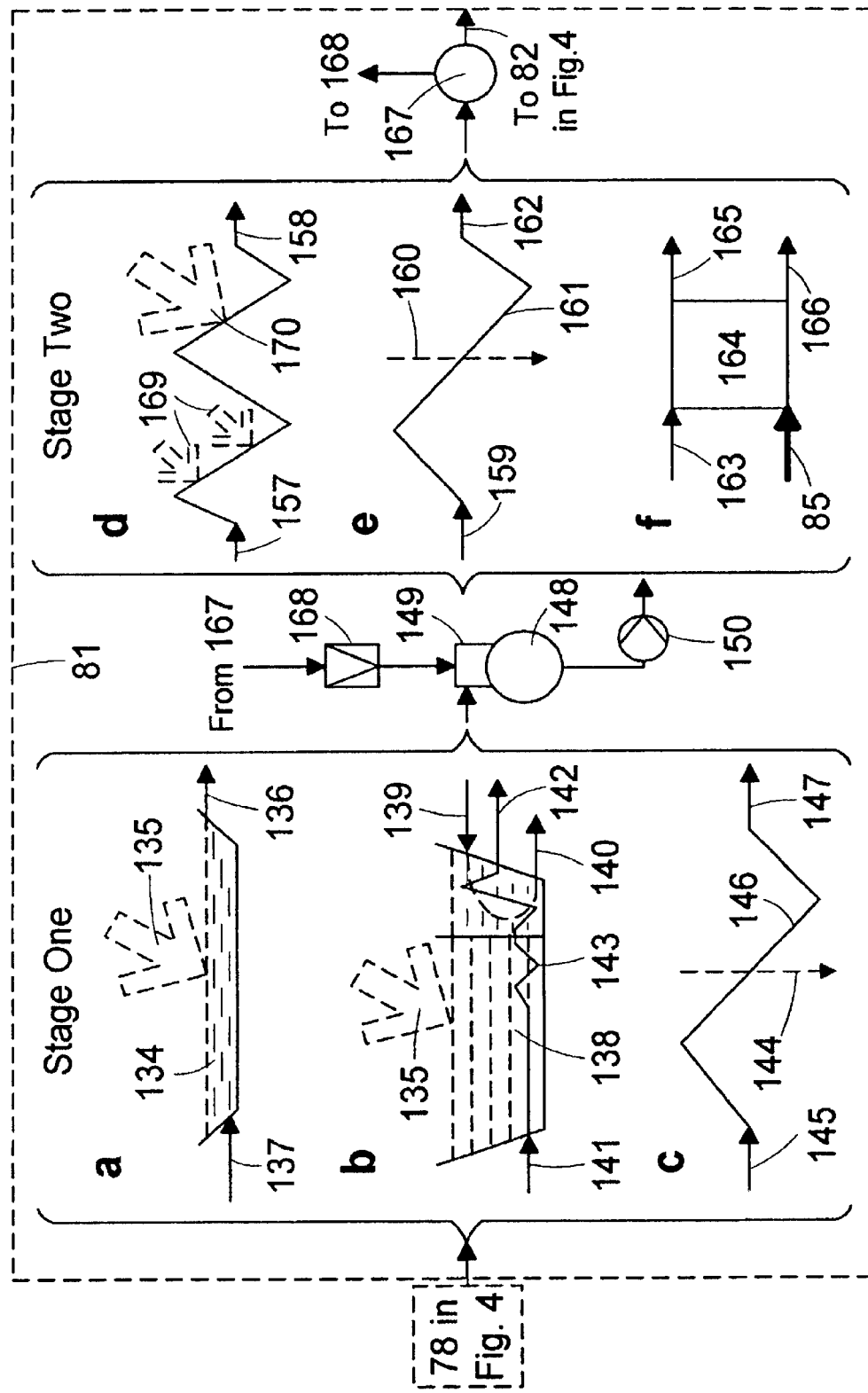
FIG. 11 presents the fragmental alternatives of flow diagram of water heating by one or two compatible of the principally possible heat sources.
Figure 15:
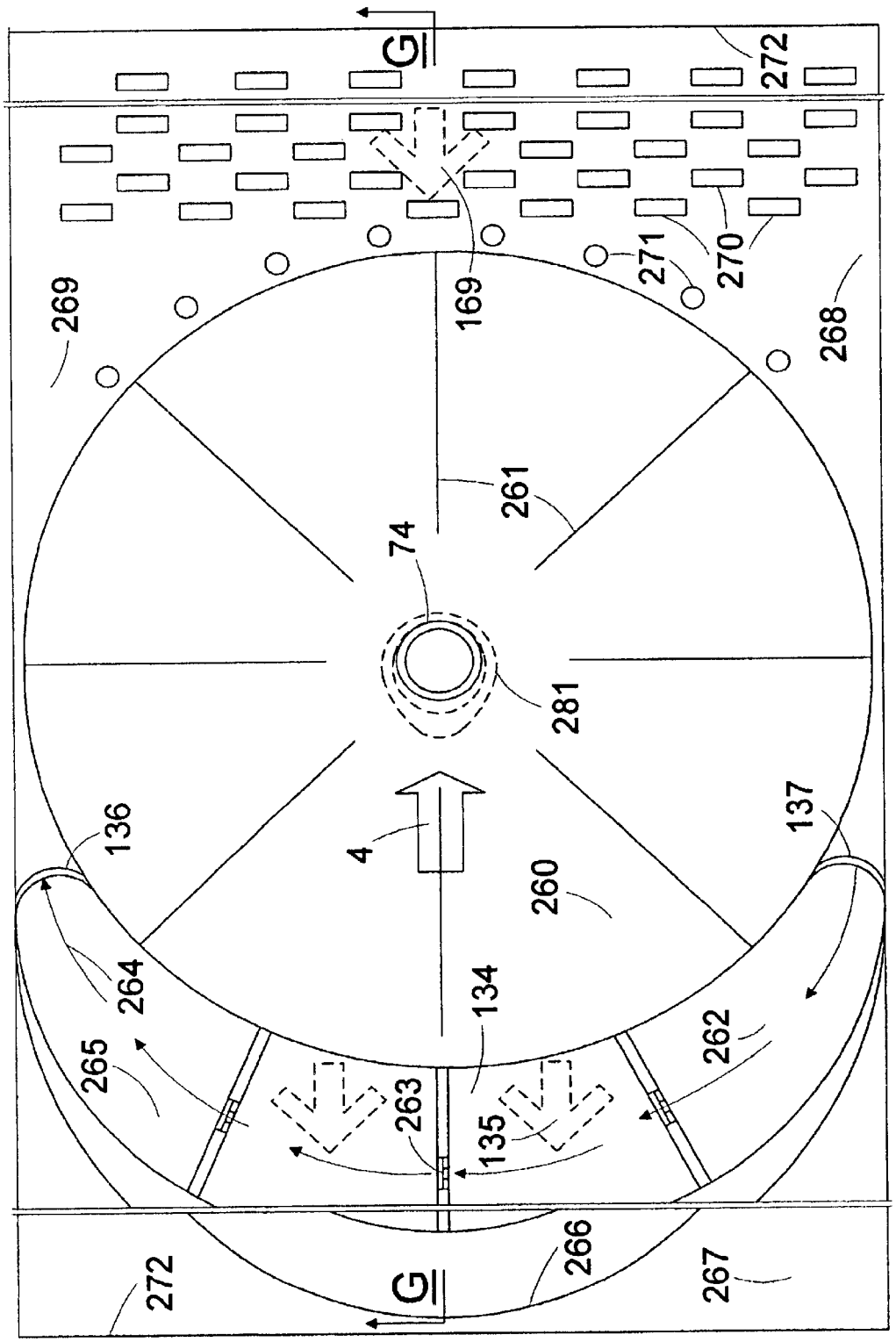
Figure 16:
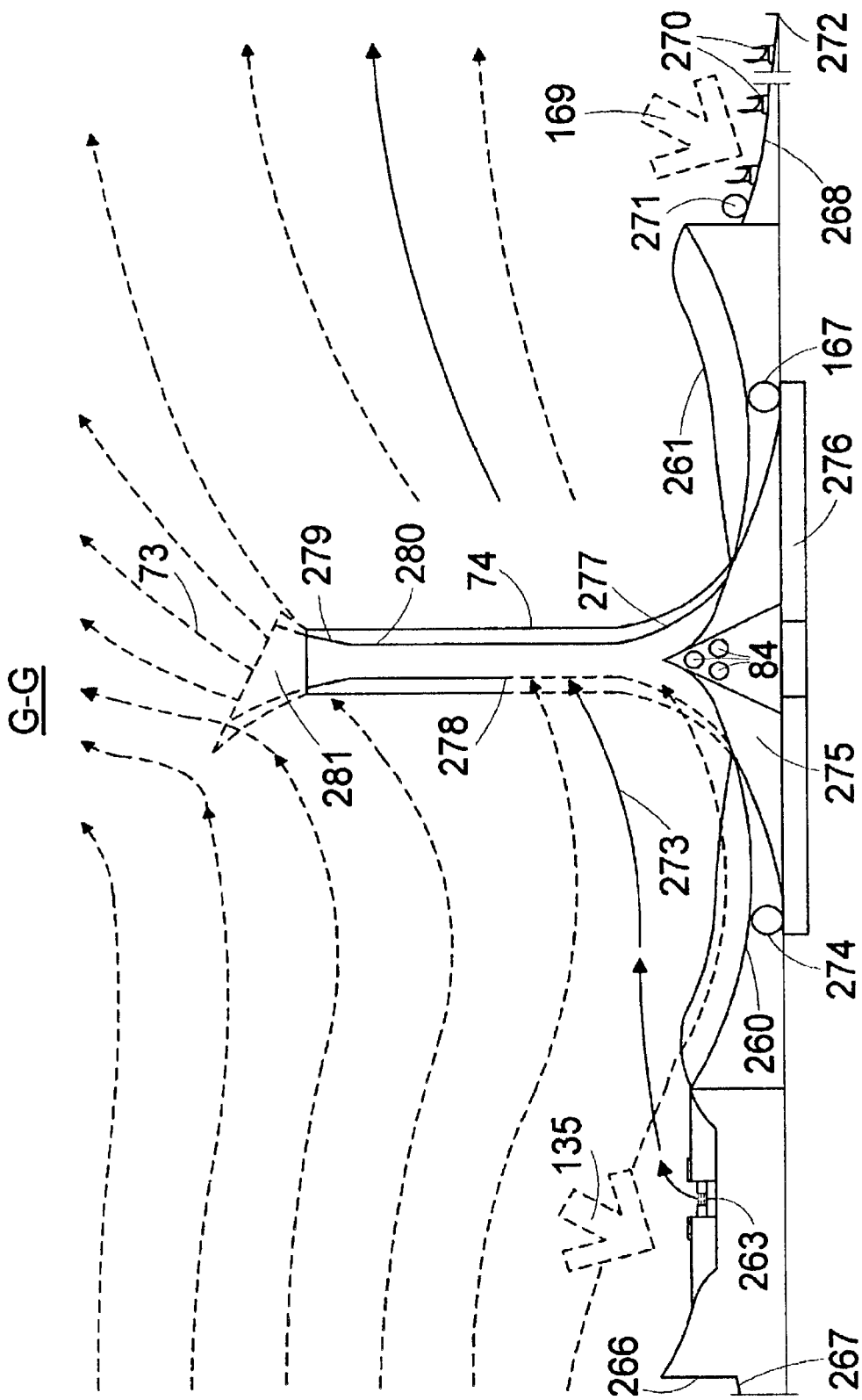

The system comprises one or two heating stages and has one or two compatible heat sources at one site of the vortex plant. Two sources, or one source with storage of heated water, are preferred. Because, using a large amount of low-temperature heat, an annual operation time of the vortex power plant can be longer than last the sufficient winds or these winds plus one heating source, first of all solar. For this aim the possible alternatives are improved via intensifying. The choice can be made at construction of the heating system due to local conditions from the next alternatives:

(1) A first stage of preheating lower of 100° C. of recirculated condensate by one heating structure installed after preliminary choice from the following principally possible alternatives:

a) A sectioned solar pond 134 at radiation 135 with water output 136 and regime storage 148 (a in FIG. 11; FIGS. 15, 16). A low-temperature water inlet 137 gives low specific surface of the pond. An inlet section 262 accumulates cold water at the dark times. The series sections have a shoal black bottom and are divided by spillway dams with staged horizontal sluices 263 for the warmest surface water 264 output 136 after outlet section 265 accumulating hot water. Water and heat losses are partially recycled into the vortex tower by sucked airflows as 273.

b) A solar pond with salty water, seasonal or off-season heat accumulation 138 and regime storage 148 of condensate 141, 142 after intensified near-bottom convection surfaces as 143 (b in FIG. 11; FIG. 17) made of pre-coated carbon steel tubes. The regime storage is minimal if is used alternatively additional waste or geothermal heat 139, 140.

c) Similar intensified heaters 146 on geothermal waste or initial beat 144 for preheating 145 with outlet 147 (c in FIG. 11).

Storage 148, deaerators 149 on steam of reducing station 168 and pumps 150 are used after the first stage.

(2) A second or one installed stage of condensate heating nearly to 100° C. after preliminary choice from the next principally possible alternatives compatible with the first stage:

a) Field of intensified solar heaters as 157, 158 at direct 169 and reflected 170 radiation (d, FIG. 11; FIG. 2).

b) Intensified convection heaters 161 of condensate 159, 162 installed alternatively on geothermal, or waste and secondary heat 160 (e in FIG. 11) of thermal or atomic station; or initial heat of old thermal or atomic station.

c) Alternative starting-backup solar water heaters giving higher water temperature 164 on any available heat source 85 (f in FIG. 11), gradually heating shut storage 167 of correspondingly pressured water 163, 165.

At choice of the alternative (2)a, the intensified two-step solar heaters (FIG. 2; d in FIG. 11; FIG. 12, 13) heat slightly pressured water without vaporization. Heating is made in solar reflector 169 and solar collector 170 in wide range of inlet temperature and flow rate, using series, parallel and combined water ties 196, 198, 200.

A cylinder parabolic reflector concentrates fuzzy cylindrical filament similar coarsely to correct line focus. The reflector is sectioned with modules as 180 having air gaps as 188 and comprises (FIG. 12):

a) An uptake water supply header 171 with intake 172, top left and right outputs 173, 174 and hatch 175.

b) Headers 176, 177 having hatches 178, 179 and calibrated holes as 184. The module 180 comprises cylinder parabolic reflecting and heat conducting thin surface 181 made of aluminized and glassed sheet carbon steel preliminary machine polished; back wall 182 made of U-form sheet carbon steel. The units 181 and 182 are machine-welded, forming a channel 183 showed in the separate sectional view D—D in FIG. 12C. The channel has insulation cover from the backside. The module heats a water flow 185 till an output 186.

c) A lower header 187 collecting water after modules as 180, with left and right flows 189, 190 and an outlet tie 196. Side additions to the header 187 as passages 191, 192 have horizontal converging passages 193, 194 of increased diameter, connected through a central header 195 of larger diameter for flow output 197. The header 195 has said tie 196 with the header 187. The lower parts of passages 191, 192 have controlled inputs 199, 201 from headers 198, 200. The headers 171, 195, 198 and 200 bear and turn reflector with collector.

A horizontal collector of reflected radiation comprises the same converging pipe passages 193, 194 having a single horizontal axis superposed with an axis of the cylindrical filament of concentrated flux. This collector of increased diameter yields additional effects relative to expensive fine processed and tuning conventional heater. Low heating temperature increases specific heat capacity and daily duration of solar heating, reduces quality requirements and raises reliability because of absence of boiling crisis. Similar starting-backup heaters can be made additionally with water heating up significantly higher of 100° C. under higher pressure.

Figure 13A:
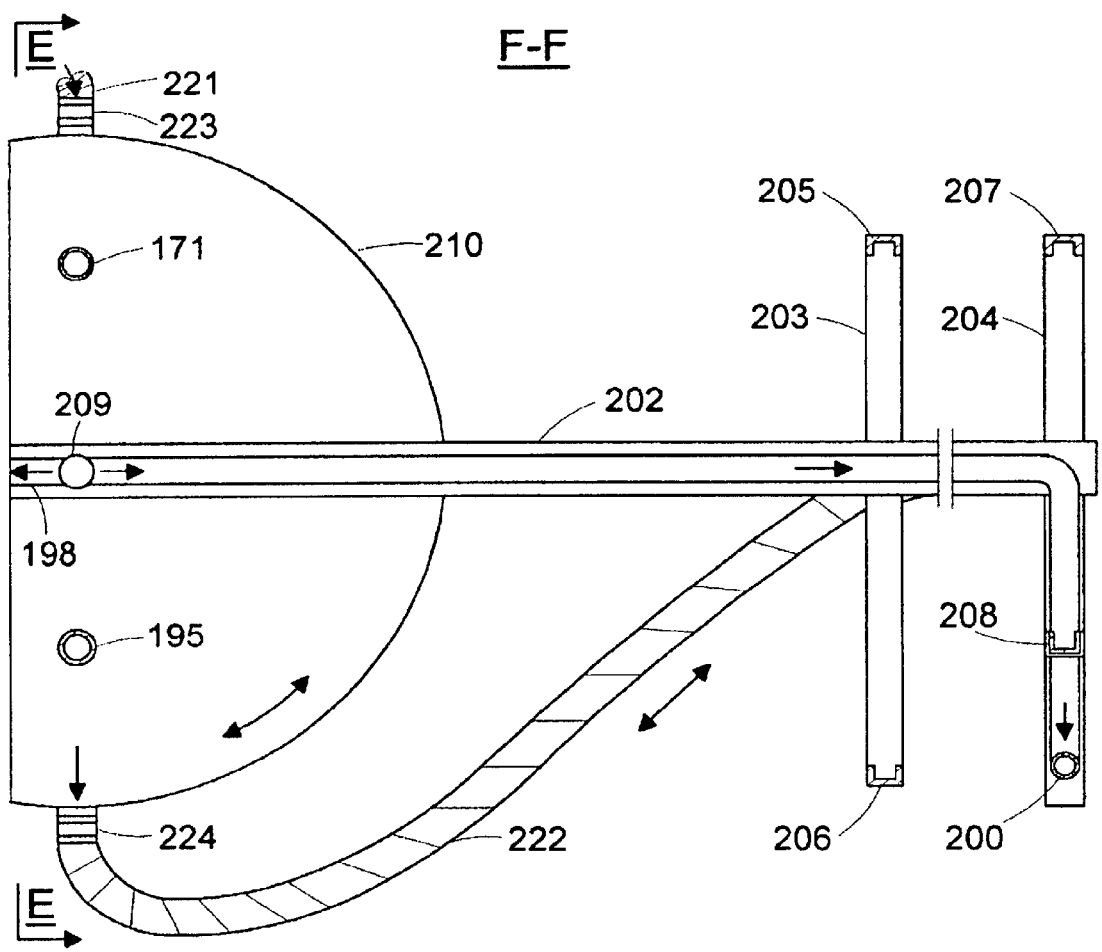
FIG. 13A, FIG. 13B are plane and left side sectional views of turning and foundation parts of solar heater.
Figure 13B:
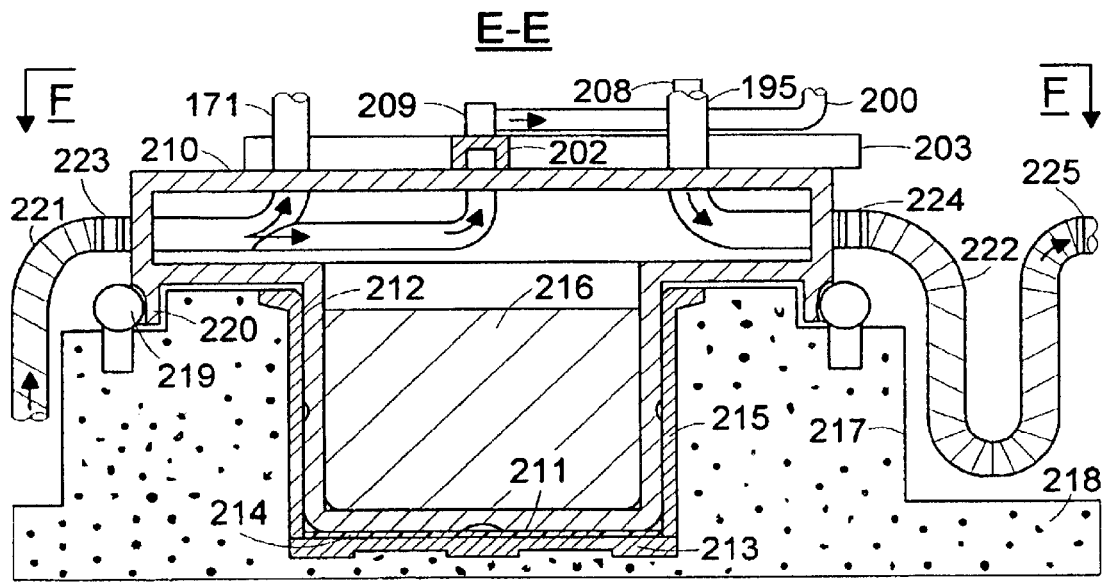
Figure 14:
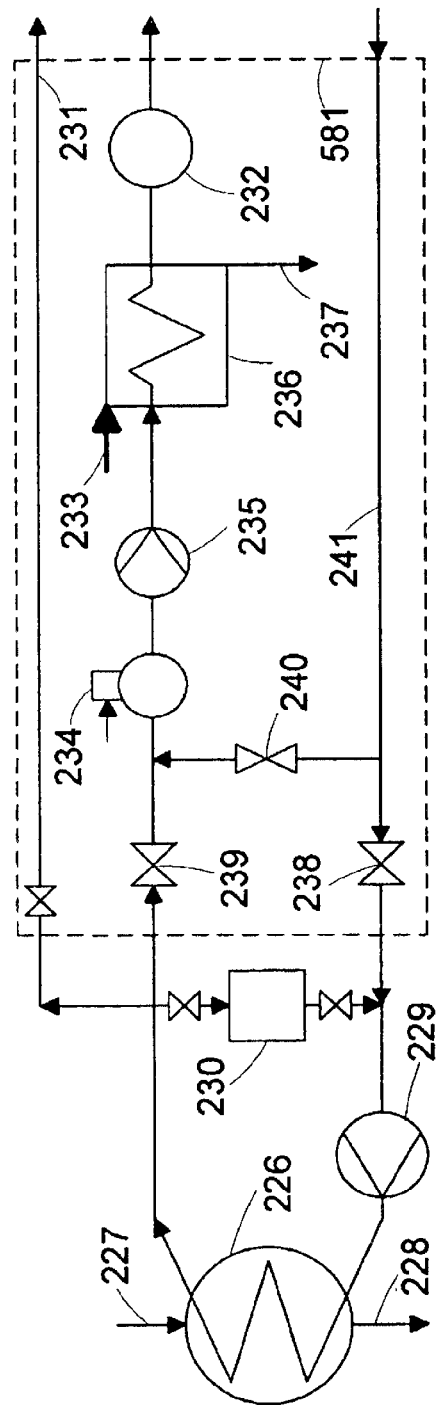
FIG. 14A, FIG. 14B show versions of water connections of vortex plants: with condensers and gas exhausts of thermal power station; with condensers and steam extractions of turbines of atomic power station.
Figure 14:
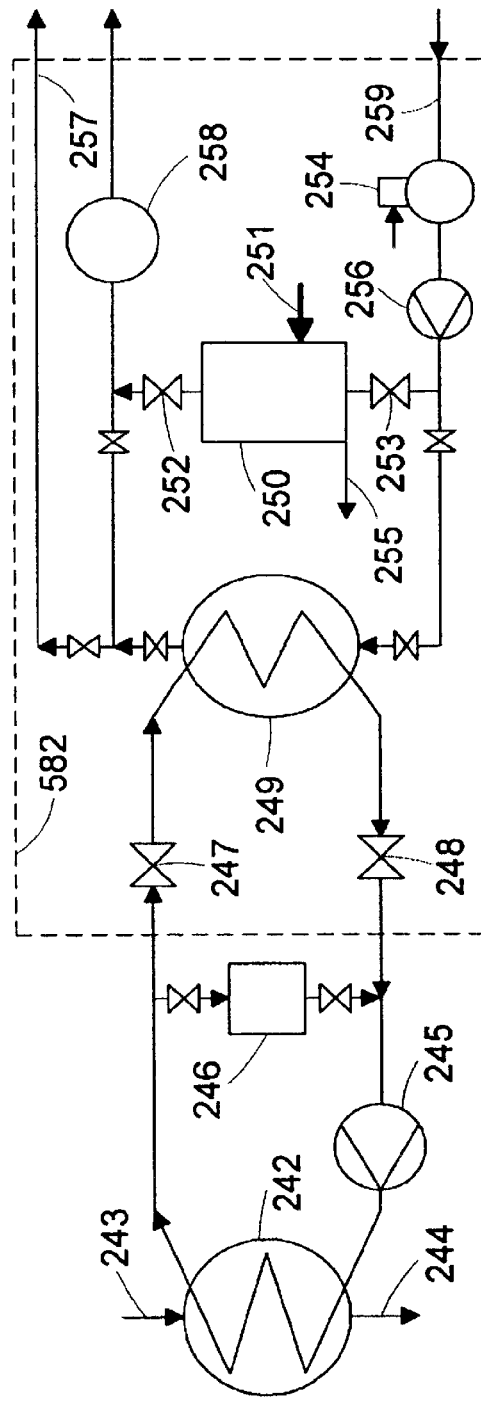

The turning and foundation parts of heater comprise (FIGS. 13A, 13B):

a) A horizontal welded frame 202 having symmetrical crossbeams as 203 and end beams as 204 with vertical stays as 205, 206, 207, 208 supporting the headers of the heating part as 176, 177 and 187.

b) A circular steel case 210 supporting the frame 202 and headers 171, 195, 209 via sweep shoe elbows. A lower cylindrical case part is a skidding bearing step with polished surfaces 211, 212.

c) A modified air-lubricated thrust bearing comprising said step and a pillow block 213 with cover 214.

d) A modified radial bearing comprising polished cylindrical part of the case 210 and a fixed locking ring 215 made of several babbit half-liners, surrounding the cylindrical part filled by a balance mass 216.

e) A concrete foundation having aerial part 217 and wider underground part 218.

f) Several self-braking worm drivers as 219 discretely rotating a gear 220 integrated with the case 210.

g) Inlet and outlet connecting hoses 221, 222 with turning connectors 223, 224 and turning ends as 225. Construction of heating system from the possible alternatives after thermal or atomic power station has significant peculiarities. They are caused by sucking of the distanced vortex tower, low water temperatures, and safety problem:

1) If vortex power plant is installed near the large thermal station then can be used the next usual and additionally combined parts (FIG. 14A):

a) a modified condenser 226 with a turbine exhaust steam 227, back condensate 228, circulation pump 229, and water cooler 230 replaced by water from vortex tower for preheating lower of 100° C.;

b) an additional part 581 receiving exhaust gases 233 after steam generators or gas turbines for heating up nearly to 100° C. in added heater 236 with its exhaust gas 237, reservoir 232, deaerator 234 and pump 235;

c) fitting 238, 239, 240 distributing water 241 between condenser 226 and heater 236.

2) If vortex power plant is installed near an obsolescent steam power plant then is feasible a sparing regime with decreased steam parameters of boiler for heating the water for vortex plant.

3) After existing atomic electric station with steam-turbine cycle alternatively can be used (FIG. 14B):
a) a modified condenser 242 for exhaust steam 243 with back condensate 244, pump 245 and cooler 246;
b) an additional part 582 with fitting 247, 248, interim anti-radiation heater 249, additional heater on extraction or back-up steam 251, condensate to turbine 255, fitting 252, 253, pump 256 and deaerator 254 for condensate 259, tie 257 for preheated condensate, and storage 258 for heated-up condensate.

4) Analogous approaches are feasible through prolongation of living cycle of the old atomic power station via sparing change of design of fuel cells at low temperature of water after intermediate heater, the water is transmitted through water ties to the vortex power plant.

5) At installation of a new atomic station heating water for the vortex power plant can be used a modified safe reactor with radically decreased temperatures of cooler in the hot loop. The temperatures are such that output of the cool loop is higher of 100° C. The constant inlet temperature and mass flow rate of heated water after mixing reservoir provide high stability of the reactor. The reactor has constant heat rejection from the core, high temperature drop and heat transfer. As a safe alternative, the reactor can be made under sectioned solar pond storing additionally preheated water and supporting stable input into cool loop of the reactor.

6) A streamline site of the vortex power plant is used for local water heating and storing and comprises (FIG. 15-17):
(a) A circular central zone 260 of concave form with radial edges as 261 converging to streamline columns 277 of vortex tower. A smooth surface 6 of this zone directs air circulation to the sucking vortex tower.

For condensate preheating alternatively can be made a sectioned solar pond 262, 265 with regime storage 271, 274, or a solar salty pond giving seasonal or inter-season heat storage 138 with water regime storage 148. The second heating stage is a field of two-step solar heaters as 270 with slightly pressurized reservoirs as 167.

(b) An outside zone 267, 268, 269 with barrier 266 and depression with dense coverage and fencing 272. In the second embodiment of this invention the steam-enhanced vortex plant produces water and conditioned air, having a tower that is a simplified version of the tower described above, and comprises (FIG. 5): the energizer 501, swirlers 502, 503, re-enhances 557, separator 558, diffuser 565, and a conditioner 283 directing airflow 284 conditioned via tracks of cooler water 285, warmer water 286 and steam 287, 288 with flexible water and steam nozzles as 289, 290, 291, 292.

The conditioner 283 can turn and has adjustable retractile fins 293 directing airflow 284 according to location of conditioned landscape zone during the calm. During the winds is used an ejecting exhaust effect via a lee-side turning of an opening 294.

Control of the airflow 284 is made in wide ranges of ambient air parameters for favorable partial corrections of local weather via initiation or minimizing of the clouds, rains, and temperature changes. In the third embodiment the steam-enhanced vortex plant produces only water and is additionally simplified version of the simplified tower described above having diffuser with retractile vanes as 70, 71 and adjustable fins as 155 in FIGS. 1, 4.

The Process and Functioning of the Vortex Power Plant

Details of the process are disclosed with respect to main regimes of functioning such as plant starting-up, operation under power loading and switching out at the calm, insufficient and sufficient winds.

Figure 2:
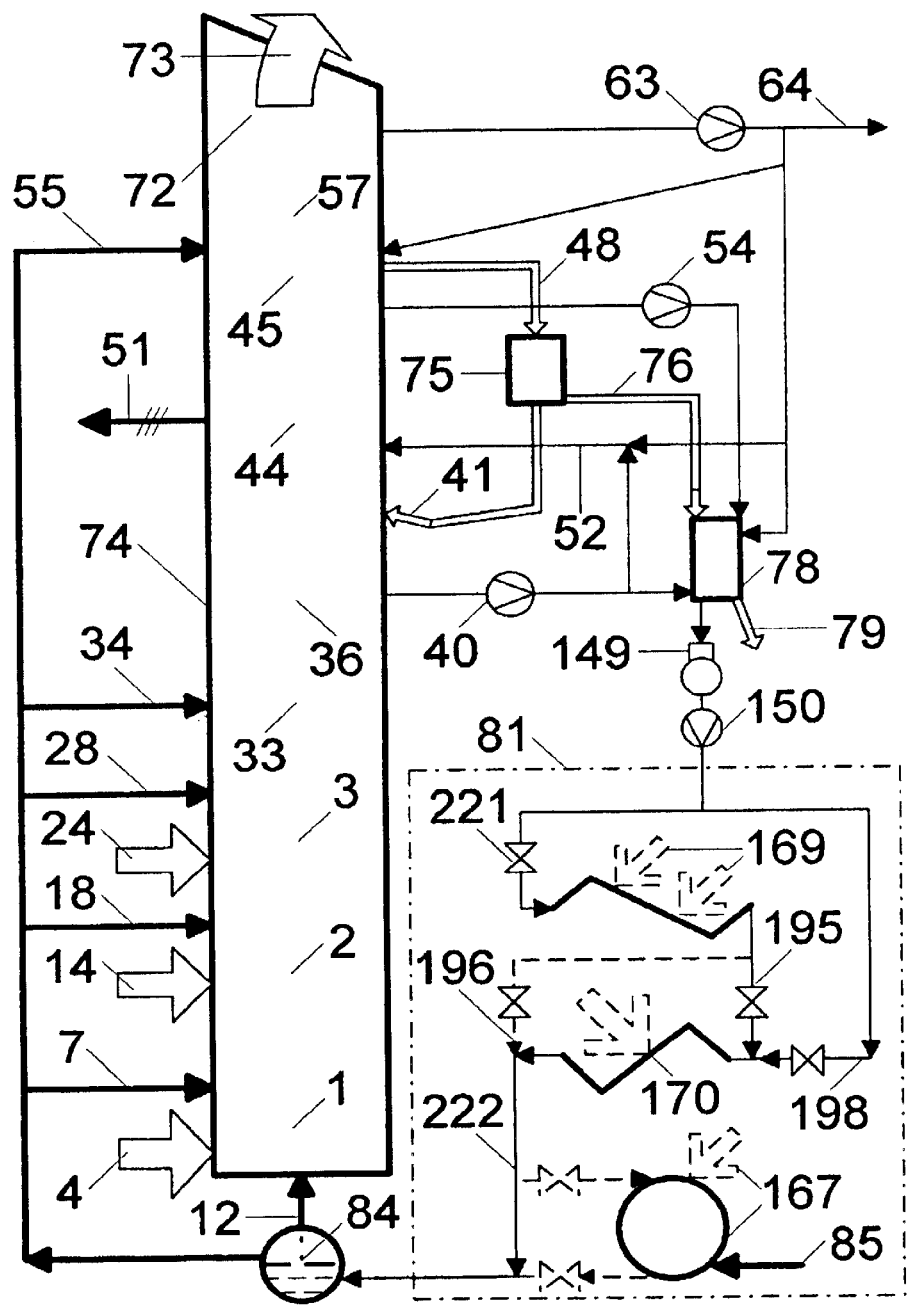
FIG. 2 is a general flow diagram of steam-enhanced vortex power plant with two-stage solar heaters.

At starting-up under the calm the supplementary heat source is used directly or through storage of water heated nearly to 100° C. The flash-off drums with steam nozzles in the tower are heated up preliminary through water circulation as 83. The condensate systems and pools of traps are preliminary filled, and inlet air vanes are shut. The starting process of vorticity energizing in the vortex channel 280 (FIG. 15) goes downward and begins from the upper part of the channel having minimum air column for vorticity energizing, similarly to the natural tornado:

(1) The first step envelops the upper re-enhancer 557 in the tower (FIG. 1). The flash-off drums with steam nozzles as 556 start to flash, accelerate and inject the quasi-tangential and upward jets of saturated steam. Under excessive steam pressure the fast steam jets continue to expand and accelerate in a peripheral layer of the re-enhancer before mixing with colder inside air. An ascending peripheral layer of swirling steam is formed along the confining circular wall of the channel. The hot steam jets and cool air mix in the whirl under significant difference of pressure, viscosity and other parameters of properties. It gives high potential for vorticity energizing and transfer to inside and upper air layers. This ring layer differs from similar wind-forced layer by smaller initial thickness, but higher tangential and axial velocities giving higher specific kinetic energy augmented by the latent vaporization heat of the steam. Next, the saturated steam of higher temperature and pressure can be used for intensifying this starting mechanism at unfavorable weather conditions. Following to development of the vortex flow, the steam parameters can be gradually reduced to the level between the decreasing pressure of swirling inner air and the pressure of ambient air.

The saturated steam partially condenses at contacting the colder air with partial heating and partial conversion of released latent vaporization heat into kinetic energy of air continuing to swirl and ascend. Meantime the whirling ring is further forced and increased inward and upward by the growing steam mass and angular momentum. By virtue of the larger rotation moment of the forcing peripheral layer, it generates and increases vorticity of the inner and higher layers. The tangential and axial velocities become rapidly increased in all the layers enveloping upper units till the top of the channel at shut air vanes. In the central air zone of these units is developing a faster vortex core having lower sub-atmospheric pressure. It gives possibility to decrease pressure of peripheral steam jets and to open gradually all inlet vanes directing ambient air of higher pressure. The steam jets suck outside air and then force it inside the channel. The pressure and density differences start to move also the lower colder air layers. Sucking action of higher steam jets supports this upward sucking also. It gives possibility to switch on the steam nozzles as 535 in lower located swirler 533. They give additional energizing of vorticity and support ascending helical motion of air-steam mixture through upper swirled zones. Then appears possibility to open relating lower inlet air vanes. This staged process involves in series the swirlers as 503, 502 and 501.

(2) An intensive heating of the inside air by steam creates an important second mechanism of the upward helical air motion in the lower located units during the second stage of the starting-up process. The colder ambient air, having larger density, starts a centripetal motion through all-around opened vanes of the swirlers and displaces upward the inside warmer air of the higher units, thus augmenting an ascending convection-and-vortex motion along the channel. The accelerating motion of the displaced ambient air occurs through the vanes, supporting high differences of the pressure, temperature and humidity relative to the air-steam mixture in the upper part of the channel. The inlet vanes direct air helically creating additional rotation moment and decrease of pressure. It gives possibility to switch on and intensify gradually the circumferential rows of the steam nozzles as 530, 520, 508 in all tower swirlers as 503, 502, 501 having openings for the ambient air. The near-bottom vanes as 9, 11, together with inner steam jets as 512 and bottom cone 10, direct sucked meridional airflows quasi-tangentially and upward thus additionally energizing and developing an upward helical motion.

The transfer of vorticity and momentum upward and from periphery to the central axis goes faster than at the wind of the comparable power. The cause is faster acceleration under larger differences of pressure and temperature.

(3) A further process develops similarly to the process under the sufficient wind. But under the fastest subcritical steam jets it can go faster and develops higher tangential velocity of the central vortex core using also the concentrated latent vaporization heat of the injected saturated steam and of the involved ambient vapor. The growing pressure decrease along the channel and especially in the vortex core leads to a multiple increase of inlet air velocities relative to the rated average wind velocity at the site. A columnar tornado-type flow develops with stabilizing of the vortex core under kinetic energy of the steam jets and sucked air that received kinetic energy from the sucking and then forcing steam jets. Similarly to natural tornadoes, a sharp decrease of pressure leads to air acceleration with enthalpy and temperature reduction reflecting conversion of internal thermal energy of the air into kinetic energy of the vortex core. Air saturation and condensation of the vapor start at enough reduction of the temperature in the core. The core reaches maximum tangential velocity at Reynolds number of seven-eight orders of magnitude and higher. The tangential velocity of the core becomes several times higher than the increased inlet air velocity.

The main sources of energy of the developed vortex flow at absence of the wind become the heat of the involved ambient air, heat and kinetic energy of the added steam utilizing a supplementary heat source. The steam gives the main share into the excess of vortex kinetic energy convertible into electrical energy. At this stage the tornado-type flow is stabilized enough to start the process of power generation.

(4) The injectors as 80 start to accelerate and inject the magnetic concentrators. The swirled universe of magnetic concentrators as 151 becomes to rotate with standard velocity and is synchronized due to current frequency in the electric power system. The regulation is going through flexible steam jets and inlet air vanes. After synchronization of the concentrators the series modules of the three-phase conductors 549 are gradually switching-on with raise of induced voltage up to the rated level. Simultaneously is increasing the quantity of the whirling magnetic concentrators and number of their rows. Growing of the mass flow rates and velocities of the steam jets and sucked ambient air supports this process. Then the parallel modules are gradually switched-on with raise of current and electrical power. The series modules of the control section are also gradually switching-on for support of the rated level of voltage and given level of the electrical power (See FIG. 10).

Figure 10:
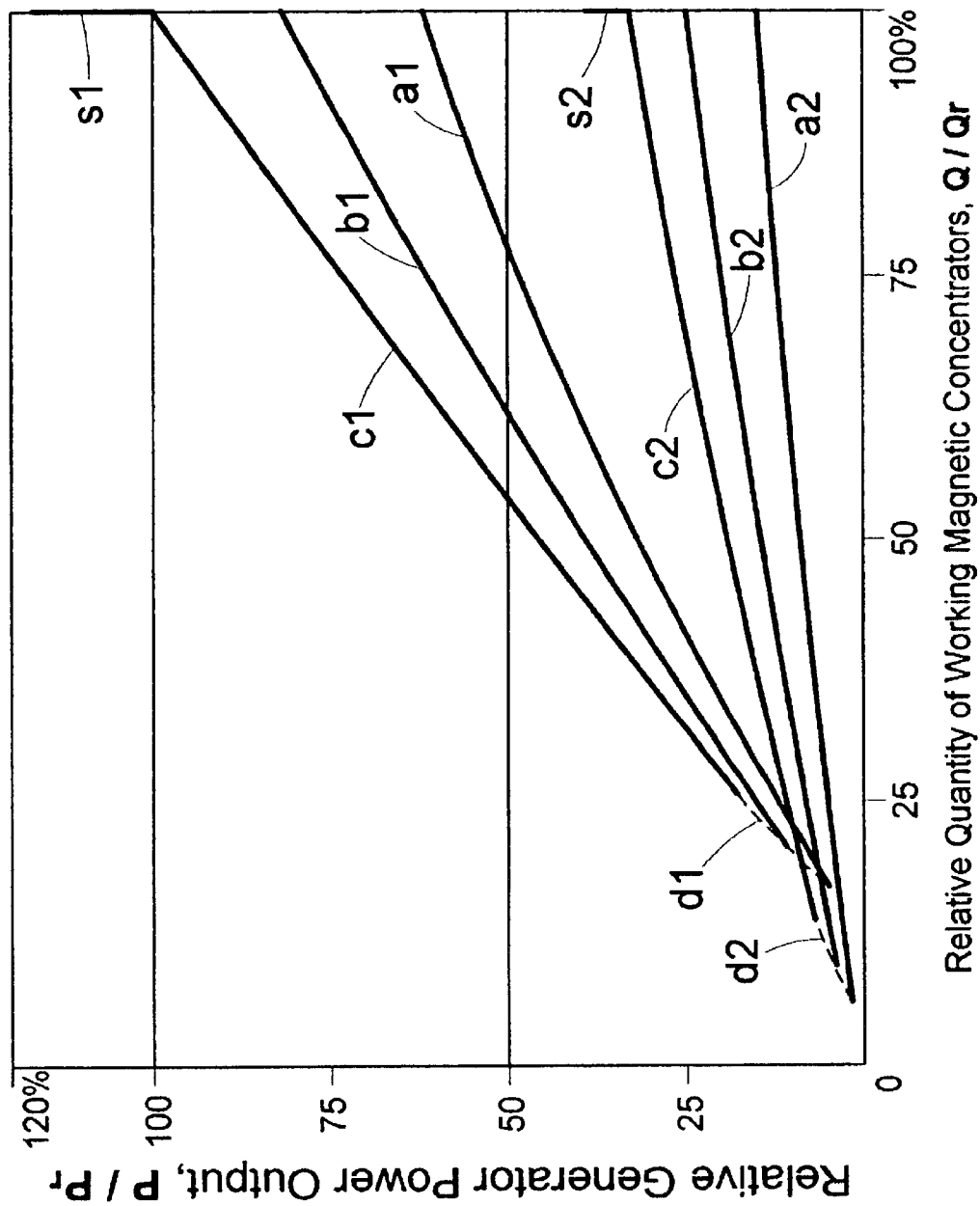
FIG. 10 is a power characteristic of flow-through electric generator with MACs and switched modules.

At decrease of power loading the partial switching-out of the modules and removing of the magnetic concentrators is going according to return order, according to generator characteristic in FIG. 10.

At insufficient winds the same starting and supporting processes are used. The difference can be that at the stadia before power generation the lee-side vanes stay shut, so these stadia take lager time. AU air vanes become open during power loading of electrical generator.

If the wind is enough for energizing of vortex flow, but not enough for providing of the given electrical power, the steam is used at the beginning stadia only for minimum control of the process stability. At the stadia of synchronizing and electricity generation the steam share is gradually increased. At the sufficient winds the steam injecting system controls stability of the process minimizing its deviations.

Normal operation under power loading comprises the supporting process stages outside of vortex tower and in its lower part, stages providing power generation in interim part of the vortex tower, and the final stages in the top exhausting part of the vortex tower and outside. The process is going along the formed columnar vortex flow from the bottom up to the top of the tower. The stages are the following (FIGS. 1–5, 11, 15):

1) Steam generation for continuing of vortex energizing, enhancement and control via the next steps:
   a) Storing and deaerating 149, slight pressurizing 150, and heating of recirculated condensate in the heating system 81 up to preferred level near 100° C. via available source of heat.
   b) Supplementary flashing as 84 of heated condensate at circulation as 83.
   c) Staged acceleration and injection of quasi-tangential and upward steam jets into the vortex channel.
2) Supplementary providing of long energizing, intensifying and control of confined tornado-type flow in the near-bottom vorticity energizing zone 1 and vortex acceleration zones 2, 3 through the next steps:
   a) Outside forming of inlet airflows as 4, 5 and acceleration at streamline site 6 with directing edges 261: via full omnidirectional sucking into vortex channel 280 and further forcing by accelerated steam jets as 7, 8 during the calm and insufficient winds; either the same with decreased or minimum supplementary sucking and further forcing by steam jets as 7 for support and control of the partial loads at the insufficient winds; or via capturing of the upwind flow as 4 under the sufficient winds, and when it is necessary for providing and control of maximum loading, also with injected quasi-tangential steam jets mainly as 8 from a shut lee-side part of the air vanes. The inlet airflows receive quasi-tangential and upward direction. Every higher row of steam jets has higher velocity, and lower level of intermediate pressure between the levels of pressure of the inner air and ambient air.
   b) Further turning of the sucked stagnant air at adjustable vanes as 9, 11, and forcing at bottom concave cone 10 with raised tangential velocity and momentum via inner quasi-tangential steam jets as 7, 8; the same for captured and accelerated sufficient wind flow as 4 at opened upwind vanes as 9 and at cone 10; the same together with partial sucking and then forcing by steam jets as 7, 8 at insufficient winds.
   c) Intensifying of initial helical acceleration by inside steam jets as 12 injected through cone 10, with further air humidifying and heating, and with additional acceleration via sucking from the zone 2.

d) Further vorticity development in vortex flow zones as 2, 3 via involving of additional mass and heat of ambient air flows as 13–16, 23, 25; 24, 26, with mass and momentum superposing with helical flow from the zone 1. It is made via sucking of ambient air through rows of opened vanes as 21, 22 and further forcing, using series rows of quasi-tangential steam jets as 17–20; 27–30; either via capturing of is the sufficient wind as 13, 14; 23, 24 through adjustable vanes as 21 into the zone 2; or the same with supplementary sucking by rows of steam jets as 17, 18; 27, 28 at partial loads under insufficient winds.

3) Development and control of the fastest whirling vortex core in the zones of supplementary steam injection 33 and air saturation 36 involving mainly the latent vaporization heat, via the next steps:

a) Superposing of the flow from the zone 3 with faster quasi-tangent steam jets as 34, 35 for acceleration till saturated state of expanding air that decreases pressure and temperature with conversion of heat into vortex kinetic energy.

b) Air saturation 36 with vapor condensation and the most intensive conversion of the latent vaporization heat into vortex kinetic energy till controlled level under decrease of air pressure in the vortex core. The most even field of flow performance is created near input into a next zone, giving the most favorable conditions for forcing of peripheral magnetic whirl created by magnetic concentrators (MACs).

c) Condensate separation 37 via centrifugal motion of droplets and filaments, their passing through grounded grid 86 with filters if necessary, accumulation as 38, 39 and removing with air choking via pressure difference and hydraulic locking controlled by outside water pumps as 40.

Such staging of process is preferred, so as the raising vortex kinetic power requires of stronger forcing and control.

4) Power generation at periphery of the zone 44 via conversion of vortex core kinetic energy into kinetic energy of the injected, whirled and voltage inducing universe of MACs as 151, using the following steps:

a) Downward acceleration of MACs under their weight with further quasi-tangential injection 41 into zone of their swirling 43.

b) Centrifugal passing of swirled MACs into peripheral layer 42 and forming of alternating magnetic whirl by universe of whirling MACs as 151 orienting pole N radially under centrifugal forces.

c) Three-phase voltage induction in stator conductors 549 via crossing by the magnetic whirl.

d) Deceleration of the layer 42 down to controlled level via partial conversion of kinetic energy of vortex core into kinetic energy of this layer with carried universe of MACs as 151.

e) Control of frequency, voltage and electrical power via change of inlet quantity, velocity and type of MACs, quantity and arrangement of switched in series and in parallel modules of the conductors, and parameters of vortex flow.

f) Energy transmission into the electric power system 51 supporting control of the given frequency and loading.

g) Cooling of the stator conductors 549 and high-permeability stator core by recirculated condensate 52, and by air 50 bypassing the generation zone 44 with further partial heat recovery into vortex energy.

5) Removing 48 of MACs from the next zone 45 through channels 548, maintenance 75 and injection 41.

6) Supplementary re-enhancing of waste airflow, further vortex deceleration, degrading and exhausting with overcoming of the top ambient pressure, and electric power augmenting via the next stepped effects:

a) Injection of additional quasi-tangential and upward steam jets as 55, 56 with airflow acceleration in a zone of steam injection 57 till air saturation 58, vapor condensation and partial conversion of the latent vaporization heat into kinetic energy of expanding airflow.

b) Condensate separation, using for stator cooling 52, recirculating into heating system 81, and excess delivery 64.

c) Deceleration of enhanced airflow in diffuser zones 65, 72 giving increase of pressure and temperature.

d) At least one step of pressure and temperature jump with axial velocity and vorticity decrease via saltatory increase of circular cross-section as 66, 67 leading to further vortex degrading and increasing of pressure and temperature.

e) At least one step of peripheral partial output of airflow as 68, 69 during the calm via at least one row of adjustable vanes as 70, 71 with deceleration and pressure increasing along central output flow 73.

f) Adjusting of row(s) of vanes as 70, 71 for ejection of flow 73 during the top wind (FIG. 16).

Switching-out of the plant begins from full unloading of electric generator. The quantity of injected magnetic concentrators as 151 is decreasing down to zero. Simultaneously the parallel modules of three-phase conductors are switching out down to zero current and power. Then the generator is switched-out from the electric power system. The steam jets in various zones of vortex flow are decreasing mass flow rate and switching-out for reduction of the excess and then absolute vortex power down to zero at the calm. At usage of the wind coordinately with generator are gradually shutting the air vanes.

Fast unloading of stator 552 is made through series switching-out of injector of MACs 41, rows of steam nozzles and inlet air vanes. For prevention of falling down of non-removed whirling MACs, if any, are used outside leaf door springs made of aluminum-and-rubber blocks. The springs are fast transforming into an inclined suppressor grid catching and removing such MACs into an outside water pool.

What is claimed is:

1. A steam-enhanced vortex power plant preferably comprising:

a vortex tower having a strengthened structure formed by circumferential airfoil-type columns bearing an inner vortex channel and accelerating inlet airflows into peripheral zones of a columnar vortex flow a staged steam injecting system flashing and accelerating jets of saturated steam into said zones, a near-bottom vortex swirling structure, a flow-through electrical generator above with flexible stator and whirled magnetic concentrators, and a top exhaust structure;

said inlet airflows are formed by sufficient winds, either by insufficient winds sucked with said jets of saturated steam, or by stagnant air sucked with the same jets at the calm;

a heating system delivering slightly pressured and heated water into stages of said steam injecting system;

a system removing out a precipitating condensate from said vortex channel;

a system injecting said magnetic concentrators into vortex zone inside said electrical generator;

a system removing out said magnetic concentrators after said electrical generator and renewing them;

a system cooling said stator by condensate recovering stator heat losses into said heating system;

a system purifying recirculated condensate and delivering excess condensate to consumers;

a streamline site supporting air circulation and fixing said vortex tower and parts of said systems;

said vortex swirling structure comprises a near-bottom vortex energizer, series vortex swirlers above, and a condensate separator located above said swirlers between said vortex channel and said tower structure;

said electrical generator comprises said stator located between said vortex channel and said tower structure and confining a zone of vortex core whirling said magnetic concentrators in a peripheral layer, a lower located injector of said magnetic concentrators and a higher located separator of said magnetic concentrators between said vortex channel and said tower structure;

said exhaust structure comprises a re-enhancer of airflow, a second condensate separator above and a top diffuser, said re-enhancer and said separator are located between said vortex channel and said tower structure;

said columns carry rows of inlet adjustable vanes located between said columns and forming together with them the rows of flexible air nozzles having outlet openings into said zones of vortex flow;

said columns are hollow and contain stages of said steam injecting system, every said stage has rows of flash-off drums integrated with flexible steam nozzles having outlets from said columns into peripheral layer of said vortex flow, said outlets are located between said air openings to form a forced rotating curtain of steam-air mixture;

said stages of steam injecting system and rows of said air nozzles are coordinately integrated with said vortex energizer, said series vortex swirlers and said re-enhancer of airflow;

said steam injecting system provides at the calm full replacement and exceeding of wind action for energizing and developing of vorticity, and for stable power generation and airflow exhausting, using kinetic energy and latent vaporization heat of said jets of saturated steam directed quasi-tangentially and upward into said vortex energizer, said swirlers and said re-enhancer, and sucking and then forcing new masses of ambient air containing further used vapor with latent vaporization heat;

said columns bear frames with outside streamline and wave absorbing covers, said frames bear and strengthen said swirlers, separators, electrical generator, re-enhancer and diffuser.

2. A steam-enhanced vortex power plant of claim 1, wherein said vortex energizer provides all-weather vorticity energizing and developing at normal operation of said plant and comprises:

at least one row of said flash-off drums integrated with said steam nozzles accelerating said steam jets quasi-tangentially and upward into said vortex channel;

at least one row of said air nozzles accelerating quasi-tangential and upward airflows sucked into said channel via ejection and then forcing by said steam jets;

a concave cone between foots of said columns, said cone is hollow and has openings for located inside steam nozzles integrated with flesh-off drums for helical upward forcing of said airflows;

said air nozzles are opened at the calm and insufficient winds for sucking of ambient air by rows of said steam jets and quasi-tangential and upward accelerated by said steam jets and said air nozzles;

said vanes are opened from upwind side at the sufficient winds for getting in and quasi-tangential and upward acceleration of the upwind flows by said air nozzles, and said rows of steam jets fulfil minimum stabilizing action.

3. A steam-enhanced vortex power plant of claim 1, wherein said series swirlers comprise:

at least two rows of said steam nozzles with said flash-off drums, giving graded raised quasi-tangential and upward velocity of steam jets for developing and strict control of said vortex flow;

at least two rows of said air nozzles, an upper row has smaller sizes of inlet vanes for raising strength;

said steam nozzles and air nozzles have same all-weather regimes that in said vortex energizer, and upper row(s) of said vanes is shut at the calm and insufficient winds with relating steam jets having maximum quasi-tangential velocity, for raising a humidity of swirled air up to saturation phase with simultaneous conversion of latent vaporization heat into vortex kinetic energy up to controlled level yielding forming of stable fast whirling vortex core.

4. A steam-enhanced vortex power plant of claim 1, wherein said condensate separator uses centrifugal effects in said fast whirling saturated vortex core after condensate precipitation and comprises:

a circumferential trap with inner opening having grounded steel grid with filters for condensate;

a circular plastic airfoil dividing said trap on warmer and cooler parts;

two circular concentric reservoirs at a bottom of said trap for condensate of different temperatures, with outside pumps controlling water levels against of vortex sucking.

5. A steam-enhanced vortex power plant of claim 1, wherein said injector of magnetic concentrators forms and supports an alternating magnetic whirl via controlled injection and upward helical acceleration of said magnetic concentrators by sucking and swirling vortex flow, and comprises:

at least two circumferential layers of batching bins containing separately at least two types of said magnetic concentrators, having quantitative controllers and placed at different heights for different initial velocities of injected magnetic concentrators;

descending tracks for initial acceleration of said magnetic concentrators under their weight with further partial ascending for upward quasi-tangential injection and directing corrections via inlet circumferential rings choking air inside said vortex channel;

at least two said rings having rhombic cross-section, controlled inlet and outlet blinking doors, and adjustable concave bulkheads changing form synchronously for directing of said magnetic concentrators into vortex flow;

said injector is made of non-magnetic plastics partially covered by water-cooled smooth rubber.

6. A steam-enhanced vortex power plant of claim 1, wherein said electrical generator comprises:

a flow-through stator with the switched modules of three-phase conductors, having different lengths and forming flexible induction and control sections distributed uniformly in a high-permeability magnetic core of said stator;

an outside switching subsystem having hitless transfer switches connected with said modules for operational change of said section;

a circular wall of said channel resting on said stator on the inside and detaching said stator from vortex flow;

a track of condensate cooling stator and a track of air cooling stator and bypassing said vortex core;

an adjustable universe of said magnetic concentrators whirled by peripheral layer of said vortex core and forming an alternating magnetic whirl crossing through said conductors with three-phase voltage induction;

said layer, enhanced by kinetic energy of said vortex core, has intermediate velocity and high angular momentum and creates synchronous interaction of said magnetic concentrators with one-named conductors via coordinated sizes of said conductors, magnetic concentrators and channel, and via synchronous secondary induced magnetic field of said stator at frequency control by the electric power system;

said magnetic whirl lasts at enough velocities of vortex flow until vortex tangential, axial forces and centrifugal forces of said magnetic concentrators exceed over decelerating forces;

said velocities are provided via limitation on diameters of said channel and magnetic concentrators, control of inlet velocities and support of smoothness of said concentrators and wall of channel;

said alternating magnetic whirl is controlled through type, quantity and inlet velocities of said whirled magnetic concentrators, together with control of said switched modules and said vortex flow performance, and through control of electrical parameters by the electrical power system;

said sucking forces of vortex core under high decrease of pressure, together with action of said secondary magnetic field, protect said channel and said stator from excessive stresses under centrifugal forces of said magnetic concentrators.

7. A steam-enhanced vortex power plant of claim 6, wherein said magnetic concentrators (MACs) of said generator can be at least of two types of different magnetic flux density and weight, and every said MAC comprises:

(1) a high-permeability ring bearing three constricting permanent magnets converging symmetrically out of center of said ring with focused maximum of magnetic flux density in an external zone crossing every of three-phase conductors of said stator at operation of action of said electrical generator;

(2) a profiled circular magnetic enhancer with a through hole, made of electrical laminated steel, raising magnetic flux density in said external zone and fixing together the ends with poles N of said magnets;

(3) two nested spherical shells made of fiberglass laminate with air gap between them:

an inner shell smooth outside, fixing said ring, said magnets and said enhancer and resting on said ring;

an outer two-side smooth shell with stabilizing ventilation holes, protecting said inner shell;

said inner shell has a partial air gap relative to said enhancer, slackening stresses from said outer shell;

(4) an air space in said inner shell, having sub-atmospheric pressure favorable for said magnetic flux;

said MAC has gravity center located out of geometrical center on an axis of said magnetic flux, giving centrifugal radial orientation of said pole N at whirling of said MAC;

said external zone has effective width and depth equal nearly to sizes of cross-section of said conductor;

said outer shell has diameter equal nearly to width of three adjacent stator slots with three teeth;

said permanent magnets and ring in said types of MACs are made of the following materials:

(a) at least two types of MACs with at least two different laminated hard-magnetic plastics having higher and lower permanent magnetization and weight, and ring made of reinforced high-permeability plastic, that for said generator having minimal or middle rated power;

(b) a neodymium-boron-iron laminated alloy having high permanent magnetization, and ring made of silicon laminated steel, that for said generator having higher or maximal rated power, and one of hard-magnetic laminated plastics with lower permanent magnetization and weight, and ring made of reinforced high-permeability plastic, for the same generator;

said working universe of MACs has controlled number of rows with rated diameters, quantity and inlet velocity of MACs, which are correlated with inner diameter of said vortex channel so that said quantity is a common divisor to said inner diameter and 3,000/3,600 revolutions per minute.

8. A steam-enhanced vortex power plant of claim 1, wherein said separator of magnetic concentrators (MACs) comprises:

a circumferential trap with an inner opening for centrifugal removing out of said MACs;

panels dividing said trap at least on three concentric parts for rough sorting of on-line, partial operable and damaged MACs, according to their weight and to eddy drag of outer shells giving different trajectories;

impingement plates at inner walls of said trap damping residual kinetic energy of sorted MACs and conversing it into heat of condensate then directed into said heating system for heat recovery;

said pools have bottom openings leading into channels for removing out of sorted MACs together with water into a maintenance system renewing said shells and augmenting magnetization of said MACs if necessary;

said trap is made of smooth fiberglass laminate and partially covered with water-cooled rubber blocks.

9. A steam-enhanced vortex power plant of claim 1, wherein said re-enhancer of airflow comprises:

at least one row of said air nozzles, shut at the calm and insufficient winds;

at least one row of said steam nozzles with said flash-off drums;

said steam nozzles heat, humidify and re-accelerate a waste airflow with controlled air saturation and with sucking out of said waste airflow from lower located generator giving raise of electrical power and process stability via enhancing of whirl of said MACs;

said waste airflow saturation and condensate precipitation with separation in said second condensate separator yields release of latent vaporization heat converting into additional kinetic energy of said airflow giving additional raise of said generator electrical power and stability, and enough kinetic energy for airflow exhausting through said top diffuser at the calm and insufficient winds.

10. A steam-enhanced vortex power plant of claim 1; wherein said top diffuser comprises:
- gradually and abruptly expanding parts with telescoping vanes which control side outlet airflows;
- retractable top fins forming a wind-and-power operated cowl for control of an exhaust airflow;
- said diffuser makes staged deceleration of airflow with reduction of vorticity and increases pressure up to sub-atmospheric level sufficient for exhausting of airflow;
- said vanes and fins create ejection effect of sufficient wind after turning an opening of said cowl to the lee side;
- said cowl during the calm and insufficient winds has maximum height raising diffuser effect with augmenting the power of said generator and decreasing usage of steam and source of heat.

11. A steam-enhanced vortex power plant of claim 1, wherein said heating system uses intensified heat transfer via water sucking by distanced vortex flow through hot water ties, augmenting capacity of water heaters and reducing auxiliary energy via support of higher water velocities, said system has alternatively one or two stages with one or two kinds of compatible and complementing sources providing low-temperature heating, and comprises:
- a first of said stages of preheating lower of 100° C. of said recirculated condensate, having alternatively:
  - a) a solar pond with colder and warmer sections having a shoal black bottom and divided by spillway dams with staged horizontal sluices for delivery of warmer surface water into outlet section storing and delivering heated water;
  - b) either a solar pond with salty water, seasonal or off-season heat accumulation and intensified near-bottom convection heaters made of pre-coated carbon steel tubes, said pond and heaters have raised heat exchange at the calm under said sucking with acceleration of heated water;
  - c) or similar intensified heaters on geothermal or waste heat used separately or in said solar pond with salty water;
- a second, or single stage of condensate heating nearly to 100° C., having alternatively:
  - a) two-step solar heaters with turned water preheating reflector and water heating up collector;
  - b) either convection heaters of condensate alternatively on geothermal heat, waste, secondary either initial heat of thermal or atomic power station;
  - c) or alternatively starting-backup solar, geothermal waste or secondary water heaters heating storage of slightly pressured water having temperature over 100° C. and pressure over 1 bar.

12. A steam-enhanced vortex power plant of claim 11, wherein said heated water is received from an existing or new thermal power station that has alternatively:
- (a) modified condensers for preheating of condensate, and further heating-up in additional heaters by exhaust gas of any steam generators or gas turbines having temperature over 100° C.;
- (b) either heaters on extraction or back-pressure turbine steam as complementing and starting-backup source;
- (c) either installing after said condensers of said solar heaters;
- (d) or installing after said condensers of heaters on geothermal heat for heating nearly to 100° C.;
- (e) or passing of old boilers into sparing regime with low parameters of steam for heating of water.

13. A steam-enhanced vortex power plant of claim 11, wherein said heated water is received from an existing or new atomic station that has alternatively:
- (a) modified condensers and steam extractions from turbines with anti-radiation convection heaters;
- (b) either modified reactors with radically decreased water temperatures in hot and cool loops, condensate heating nearly to 100° C. in safe convective heaters and delivery to vortex power plant, said reactors have high temperature drop, heat transfer and stability via constant low inlet water temperature after mixing of condensate from distanced vortex tower with stored heated condensate;
- (c) or said reactor can be made under solar pond augmenting and storing heat and raising safety and stability.

14. A steam-enhanced vortex power plant of claim 11; wherein said heated water is received from solar field with two-step solar heaters, every such heater comprises:
- (a) a water-cooled cylinder parabolic solar reflector with close fizzy focus forming coarsely a volumetric cylindrical filament of reflected radiation, said reflector comprises:
  - an uptake supply pipe header having two top horizontal distributing headers with calibrated holes;
  - modules jointed into said reflector with interim vertical air gaps, every such module comprises:
    - a first front cylinder parabolic bare made of carbon steel with coarsely machine polished, aluminized and glassed surface;
    - a carrying back wall made of U-form sheet carbon steel and machine welded with said bare, forming together a downward water cooled channel having insulation from the back side;
  - a lower located horizontal pipe header having holes for preheated water collection after said modules;
  - two uptake additions to said lower header with following horizontal headers of increased diameter, converging and connected via central downward header having central tie from said lower header;
  - additional controlled water inlets into lower parts of said additions after separate supply headers;
- (b) a horizontal pipe collector of reflected radiation focused coarsely by said reflector, comprising just said converging headers of increased diameter having a single axis superposed with a coarse axis of said fuzzy focus;
- said heating stages can be connected in series, in parallel or into combined scheme via said control tics and headers forming once-through heater flexible to changes of inlet water temperature and flow;
- said heating part yields 5÷7 discrete steps per day enough at one-axis orienting on solar rays +10÷15°;
- (c) a turning part connected with said heating part via said supply, delivery headers and a frame, with foundation via coarse bearings, and with ties sucking and accelerating heated water into vortex tower via moving hoses;
- said heaters can be made also as starting-backup giving higher outlet water temperature into a storage used at the calm and insufficient winds.

15. A steam-enhanced vortex plant of claim 1 with tower producing water and conditioned air into local zone for partial weather corrections and comprising:
- vortex energizer, at least one swirler, condensate separator, and turning diffuser with flexible nozzles injecting cooler and warmer water and steam into outlet airflow directed by outlet retractile fins;

a system for control of conditioned airflow from lower to higher temperature and humidity than has the free air.

16. A steam-enhanced vortex plant of claim 15 producing water and comprising said vortex energizer, at least one swirler, condensate separator, and diffuser with side outlet vanes and retractile fins.

17. A steam-enhanced vortex power plant of claim 1, wherein a process of operation with power generation comprises the following steps:

ormnidirectional sucking of stagnant air or insufficient wind with initial directed acceleration through streamline site having anti-radial directing edges and through said circumferential rows of opened inlet vanes of said tower, having row-by-row decreased sizes along a tower height, and further quasi-tangential directing into said near-bottom vortex energizer and upper swirlers, with raising helical acceleration via said circumferential rows of quasi-tangential and upward jets of saturated steam, supported by rows of vertical and quasi-tangential jets of saturated steam passing through said bottom concave cone;

said jets all together give raising decrease of pressure from periphery to central tower axis and upward and correspondingly raising air mass flow rate, tangential velocity and momentum;

said jets have flexible parameters and row-by-row raised acceleration due to weather and loading;

vorticity energizing and development via staged upwind getting of the sufficient winds, when they occur, into said vortex energizer and swirlers with minimum stabilizing action of said steam jets, and with change of their share into augmenting the electrical power when is necessary;

further stepped injection of the fastest quasi-tangential steam jets into said developing vortex airflow at the calm and insufficient winds, with it saturation and partial conversion of latent vaporization heat into vortex kinetic energy with forming of fast whirling vortex core, or forming the core under the sufficient wind;

centrifugal separation and removal out of condensed vapor with inertial and magnetic treatment;

forming of alternating magnetic whirl at periphery of said fast vortex core by quasi-tangential and upward injected and synchronously whirled universe of said magnetic concentrators which make centrifugal radial orienting of magnetic poles N, with transforming of excess kinetic energy of said fast vortex core into kinetic energy of said magnetic concentrators;

induction of three-phase voltage via said magnetic whirl crossing through said circumferential three-phase conductors of flow-through stator of electrical generator;

flexible control of frequency, voltage and power via control of performance of said staged steam jets and airflow, said magnetic concentrators, and said switched modules of said conductors;

cooling of said stator by said recirculated condensate recovering heat into water heating system;

centrifugal separation of said magnetic concentrators with coarse sorting and removing out, conversion of their residual kinetic energy into heat of recirculated condensate with additional magnetic treatment by said magnetic concentrators;

said separation is made at inferior limiting of airflow axial velocity, giving lifting force of airflow higher of weight of said magnetic concentrators;

renewing, superposed magnetization and recirculating of said magnetic concentrators into sucking vortex flow;

enhanced top exhausting of a waste airflow via combining of the next effects:

(a) supplementary injection of steam jets into said waste airflow with airflow saturation and partial conversion of latent vaporization heat into airflow kinetic energy with augmenting of upward forcing and sucking forces;

(b) second stage of centrifugal separation of condensate from saturated air, filtering and removing out;

(c) stepped deceleration of re-enhanced airflow, vortex degrading and pressure boosting in said diffuser for overcoming of sub-atmospheric pressure of near-top ambient air;

(d) creating of airflow additional ejection above said diffuser via top winds when they are sufficient;

flexible supplementary fleshing of heated water for generation of said fast steam jets after slight water pressuring and heating nearly to 100° C. with partial storing of said recirculated condensate, and excess delivery;

usage of one or two compatible and complementing each other source(s) of heat for heating of said condensate.

18. A method of starting of steam enhanced vortex power plant of claim 1 at the calm or insufficient winds, comprising:

energizing of vorticity with raising rotation moment in said re-enhancer by fast quasi-tangential and upward steam jets at shut inlet air vanes of said tower, and transfer of vorticity from growing peripheral layer of steam to inside air layers and upward through said second separator of condensate to top opening of said diffuser;

developing of vorticity under partial condensing of saturated steam at mixing with colder air, release and partial conversion of latent vaporization heat into kinetic energy of helical swirling mixture with fast giving development of centripetal and upward pressure decrease;

said developing of vorticity can be enhanced by higher pressure and temperature of injected steam, which are gradually reducing down to level between ambient pressure and lower inside pressure, and by upward convection;

gradual downward opening of rows of inlet air vanes due to said pressure decrease with sucking of the lower air masses upward, growing of sucked inlet airflows directed quasi-tangentially and upward by said air nozzles and by gradual downward switching-on of rows of said steam nozzles along said channel;

increasing of inlet velocities of sucked airflows several times relative to average wind velocity, growing of angular momentum and release of latent vaporization heat of saturated mixture;

simultaneous forming and developing of central vortex core with maximum tangential velocity several times exceeding said increasing inlet velocities, and stabilizing of steam-enhanced vortex flow by said steam jets;

injection, swirling and synchronizing of peripheral whirl of said magnetic concentrators giving synchronized alternating magnetic whirl in said flow-through electrical generator, and switching on of series modules of said surrounding three-phase conductors for reaching of rated voltage;

connection of said generator with power system at given frequency, gradual switching on of parallel modules of said three-phase conductors, simultaneous additional injecting of magnetic concentrators and increasing of mass of said steam jets and sucked air for reaching of the given electrical power;

providing of given schedule of power loading by change of quantity of said injected magnetic concentrators and said switched modules, performance of said injecting steam and said sucked air or wind;

providing of switching out of said plant after full power decrease via full switching out of said generator, with removal of said magnetic concentrators, and further switching out in the return order to said starting up process.

* * * * *